US008363079B2

(12) United States Patent
Fujinawa et al.

(10) Patent No.: US 8,363,079 B2
(45) Date of Patent: Jan. 29, 2013

(54) PRINTER AND PRINTER SYSTEM

(75) Inventors: Nobuhiro Fujinawa, Yokohama (JP); Setsu Mitsuhashi, Tokyo (JP); Akinobu Suga, Yokohama (JP)

(73) Assignee: Nikon Corporation, Tokyo (JP)

( * ) Notice: Subject to any disclaimer, the term of this patent is extended or adjusted under 35 U.S.C. 154(b) by 301 days.

(21) Appl. No.: 12/073,125

(22) Filed: Feb. 29, 2008

(65) Prior Publication Data

US 2008/0174747 A1 Jul. 24, 2008

Related U.S. Application Data

(63) Continuation of application No. PCT/JP2007/068664, filed on Sep. 26, 2007.

(30) Foreign Application Priority Data

Sep. 26, 2006 (JP) .................. 2006-259983
Sep. 26, 2006 (JP) .................. 2006-259984
Sep. 26, 2006 (JP) .................. 2006-259985
Sep. 26, 2006 (JP) .................. 2006-259986

(51) Int. Cl.
*B41J 2/435* (2006.01)
*B41J 2/47* (2006.01)
(52) U.S. Cl. ......... 347/224; 347/229; 347/225; 347/234
(58) Field of Classification Search .................. 347/225, 347/224, 229, 234
See application file for complete search history.

(56) References Cited

U.S. PATENT DOCUMENTS

| 5,365,307 | A  | * | 11/1994 | Sugiyama ...................... 355/45 |
| 6,195,068 | B1 | * | 2/2001  | Suzuki et al. ................. 345/2.2 |
| 6,900,825 | B2 | * | 5/2005  | Kito ............................. 347/239 |
| 2001/0004265 | A1 | * | 6/2001 | Kurematsu ..................... 347/234 |
| 2004/0060011 | A1 | * | 3/2004 | Nitta et al. ..................... 715/527 |
| 2006/0023006 | A1 | * | 2/2006 | Sawai et al. ........................ 347/2 |
| 2008/0001916 | A1 | * | 1/2008 | Nozaki et al. .................. 345/156 |

FOREIGN PATENT DOCUMENTS

| JP | A-62-13181 | 1/1987 |
| JP | A-4-264438 | 9/1992 |
| JP | A-06-138562 | 5/1994 |
| JP | A-09-226214 | 9/1997 |
| JP | 2000071578 A * | 3/2000 |
| JP | A-2000-71578 | 3/2000 |
| JP | A-2002-082581 | 3/2002 |
| JP | A-2002-094847 | 3/2002 |
| JP | A-2003-061043 | 2/2003 |
| JP | A-2003-341172 | 12/2003 |
| JP | A-2004-112460 | 4/2004 |

(Continued)

OTHER PUBLICATIONS

May 2, 2011 Search Report issued in European Patent Application No. 07807879.7.

(Continued)

*Primary Examiner* — Stephen Meier
*Assistant Examiner* — Sarah Al Hashimi
(74) *Attorney, Agent, or Firm* — Oliff & Berridge, PLC

(57) ABSTRACT

A printer includes a printing unit that prints information upon an element to be printed upon; a projection unit that projects an optical image in a position that is different from a position of the element to be printed upon in which position the printing unit is printing the information; and a control unit that causes the projection unit to project an optical image that represents the information to be printed by the printing unit before printing by the printing unit is started.

17 Claims, 18 Drawing Sheets

FOREIGN PATENT DOCUMENTS

| | | | |
|---|---|---|---|
| JP | 2004262092 A | * | 9/2004 |
| JP | A-2004-262092 | | 9/2004 |
| JP | A-2005-117119 | | 4/2005 |
| JP | A-2005-130254 | | 5/2005 |
| JP | 2005208792 A | * | 8/2005 |
| JP | A-2005-208792 | | 8/2005 |
| JP | A-2003-023566 | | 1/2006 |
| JP | A-2006-41947 | | 2/2006 |
| JP | A 2006-69104 | | 3/2006 |
| JP | A-2006-071660 | | 3/2006 |
| JP | A-2006-080652 | | 3/2006 |
| JP | A-2006-173451 | | 6/2006 |
| JP | A 2006-192600 | | 7/2006 |
| JP | A-2007-81954 | | 3/2007 |
| JP | A-2008-012795 | | 1/2008 |
| WO | WO 2006/038577 A1 | | 4/2006 |

OTHER PUBLICATIONS

English translation of Jun. 15, 2011 Office Action issued in CN Application No. 200780035887.6.

Jul. 12, 2011 Office Action issued in JP Application No. 2006-259983 (with English translation).

English translation of May 11, 2010 Office Action issued in CN Application No. 200780035887.6.

Jul. 19, 2011 Office Action issued in JP Application No. 2006-259986 (with English translation).

Jul. 12, 2011 Office Action issued in JP Application No. 2006-259984 (with English translation).

Jul. 12, 2011 Office Action issued in JP Application No. 2006-259985 (with English translation).

Japanese Office Action dated Jan. 10, 2012 for Japanese Application No. 2006-259986 (with translation).

European Office Action dated Jan. 5, 2012 for European Application No. 07 807 879.7.

Oct. 18, 2011 Office Action issued in JP Application No. 2006-259986 (with English translation).

Oct. 11, 2011 Office Action issued in JP Application No. 2006-259983 (with English translation).

Oct. 11, 2011 Office Action issued in JP Application No. 2006-259985 (with English translation).

Chinese Office Action dated May 3, 2012 in Chinese Patent Application No. 200780035887.6 (with translation).

* cited by examiner

PRINTER AND PRINTER SYSTEM

This application is a continuation of International Application No. PCT/JP2007/0686664 filed Sep. 26, 2007.

INCORPORATION BY REFERENCE

The disclosures of the following applications are herein incorporated by reference:

Japanese Patent Application No. 2006-259983 filed Sep. 26, 2006
Japanese Patent Application No. 2006-259984 filed Sep. 26, 2006
Japanese Patent Application No. 2006-259985 filed Sep. 26, 2006
Japanese Patent Application No. 2006-259986 filed Sep. 26, 2006
International Application No. PCT/JP2007/068664 filed Sep. 26, 2007

BACKGROUND OF THE INVENTION

1. Field of the Invention

The present invention relates to a printer and to a printer system.

2. Description of Related Art

In Japanese Laid-Open Patent Publication 2006-192600, there is disclosed a printer that prints an image or the like upon printing paper.

SUMMARY OF THE INVENTION

When performing printing with this type of printer, there has been the problem that it has been difficult to know the actual printing range upon the printing paper before printing.

A printer according to the present invention comprises a printing unit that prints information upon an element to be printed upon; a projection unit that projects an optical image in a position that is different from a position of the element to be printed upon in which position the printing unit is printing the information; and a control unit that causes the projection unit to project an optical image that represents the information to be printed by the printing unit before printing by the printing unit is started. It is desirable that the projection unit projects the optical image towards a portion of a body of the printer.

It is desirable that if the printer described above further comprises an actuation member that generates a signal commanding printing, the control unit causes the printing unit to start printing when the signal that commands printing is received from the actuation member during projection of the optical image by the projection unit.

The control unit of the printer described above can control the projection unit so as to make the size of the optical image smaller than a printing range over which the printing unit prints information upon the element to be printed upon. This control unit may control the projection unit so as to cause the information that specifies a range of the element to be printed upon and the printing range to be included in the optical image.

It is desirable that if the printer described above further comprises a scanner unit that performs reading a manuscript; and a manuscript cover that is disposed in a position different from that of the printing unit and covers the manuscript, the projection unit projects the optical image towards the manuscript cover.

It is desirable that if the printer described above further comprises a scanner unit that is disposed in a position different from that of the printing unit and performs reading a manuscript; and a translucent screen that is mounted upon a surface upon which the manuscript is mounted when the scanner unit is not being used, the projection unit performs rear surface projection of the optical image towards the translucent screen.

It is desirable that the control unit of the printer described above makes the projection unit project an optical image that represents a state of progression of printing by the printing unit.

It is desirable that in the printer described above, the control unit commands the projection unit to project the optical image that represents information to be printed by the printing unit, and controls the projection unit so as to gradually widen a range shown of the information included in the optical image along with the progression of printing by the printing unit. Furthermore, it is desirable that after the printing unit has started printing, the control unit of the printer described above controls the projection unit to project an initial optical image that does not include any of the information being printed by the printing unit, and then to project the optical image in which information corresponding to (a) lines that have been printed by the printing unit or (b) a line that is being printed by the printing unit is sequentially added to the initial optical image.

The control unit of the printer described above can command the projection unit to project the optical image that includes all of the information to be printed by the printing unit, and control the projection unit to gradually narrow down the range shown of the information that is included in the optical image along with the progression of printing by the printing unit. It is desirable that after the printing unit has started printing, this control unit of the printer described above controls the projection unit to project an initial optical image that includes all of the information being printed by the printing unit, and then to project an optical image in which information corresponding to (a) lines that have been printed by the printing unit or (b) a line that is being printed by the printing unit is sequentially subtracted from the initial optical image.

The control unit of the printer described above can control the printing unit to print information corresponding to the optical image designated by the signal designating the subject for being printed among the plurality of optical images, when the control unit receives a signal that orders an optical image to be made a subject for being printed among a plurality of optical images that are being projected by the projection unit. In the printer described above, the information is constituted by image data, the projection unit can project a plurality of optical images arranged in a predetermined arrangement, each of which is replayed by using each of a plurality of the image data. It is desirable that this printer described above further comprises an image sensor that captures an optical image projected by the projection unit, and outputs an image signal; an image change detection unit that detects a change of the image signal; and a printing subject designation unit that emits a signal designating an optical image that is projected in a position corresponding to a region in which the change of the image signal has been detected, as a subject for being printed, and the control unit causes the printing unit to print the information upon receipt of the signal that designates the subject for being printed from the printing subject designation unit.

It is desirable that in the printer described above the information is constituted by image data, and the printer further comprises a selection unit that selects either a first printing mode in which an image based upon a moving image file is printed or projected, and a second printing mode in which an image based upon a still image file is printed or projected; and the control unit can control each of printing by the printing unit and projection by the projection unit according to the printing mode selected by the selection unit. It is desirable that this printer further comprises a printing subject designation unit that emits a signal designating a subject for being printed; and the selection unit selects the first printing mode if the subject for being printed that is designated is a moving image file, and selects the second printing mode if the subject for being printed that is designated is a still image file.

It is desirable that in the printer described above, the first printing mode described above includes: a first moving image mode in which a moving image is projected by the projection unit, and also an image of a predetermined frame among the frames that make up the moving image is printed by the printing unit; a second moving image mode in which a moving image is projected by the projection unit, and also the printing unit is not caused to perform printing; and a third moving image mode in which a moving image is projected by the projection unit, and also images of a predetermined number of frames among the frames that make up the moving image are printed by the printing unit; and the control unit can select any one of the first moving image mode through the third moving image mode, and controls each of printing by the printing unit and projection by the projection unit according to the moving image mode that has been selected.

A printer system according to the present invention comprises an electronic camera that captures an optical image that has been projected, and transmits an image signal; and a printer including: a printing unit that prints information upon an element to be printed upon; a projection unit that projects an optical image showing a plurality of pieces of information; an image change detection unit that detects change of the image signal transmitted from the electronic camera; a printing subject designation unit that emits a signal designating an optical image that is projected in a position corresponding to a region in which the change of the image signal has been detected as a subject for being printed; and a control unit that, during projection of the plurality of optical images by the projection unit, upon receipt of the signal from the printing subject designation unit that designates the subject for being printed, causes the printing unit to print the information represented by the signal that designates the printing subject.

BRIEF DESCRIPTION OF THE DRAWINGS

FIG. 1A is a figure showing the usage position of a cover, FIG. 1B is a figure showing the storage position of the cover, and FIG. 1C is an elevation view of the printer;

DESCRIPTION OF PREFERRED EMBODIMENTS

Preferred embodiments for implementation of the present invention will now be explained in the following, with reference to the drawings.

Embodiment One

Figure 1A:
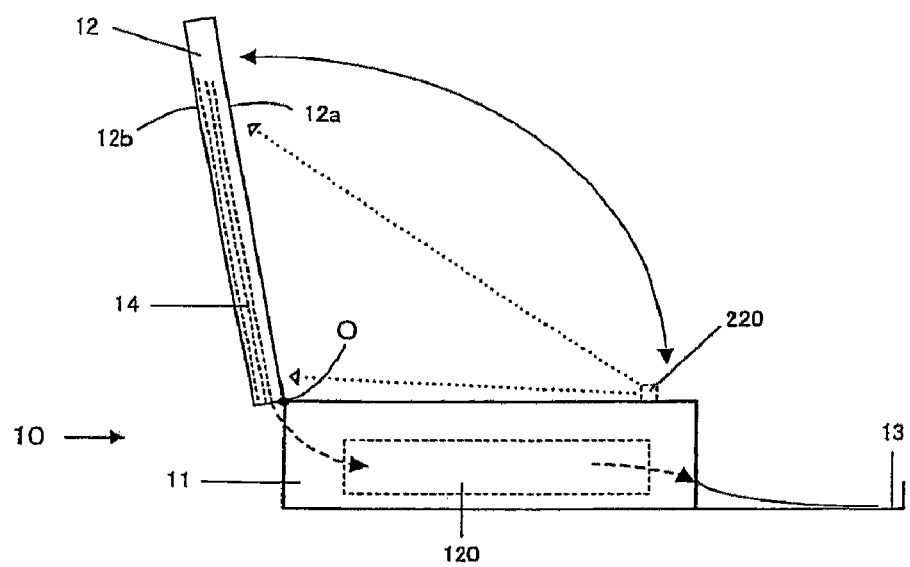
FIG. 1A through 1C are figures for explanation of a printer according to the first embodiment.
Figure 1B:
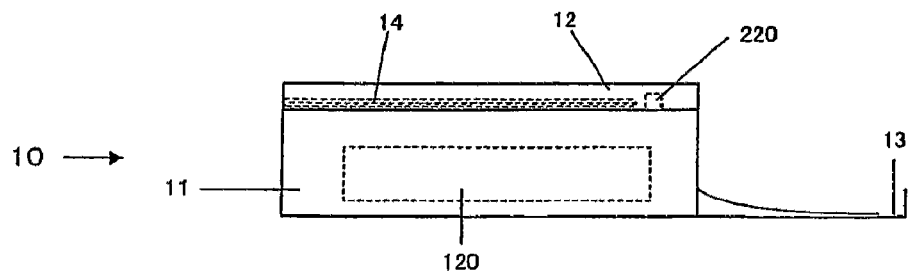
Figure 1C:
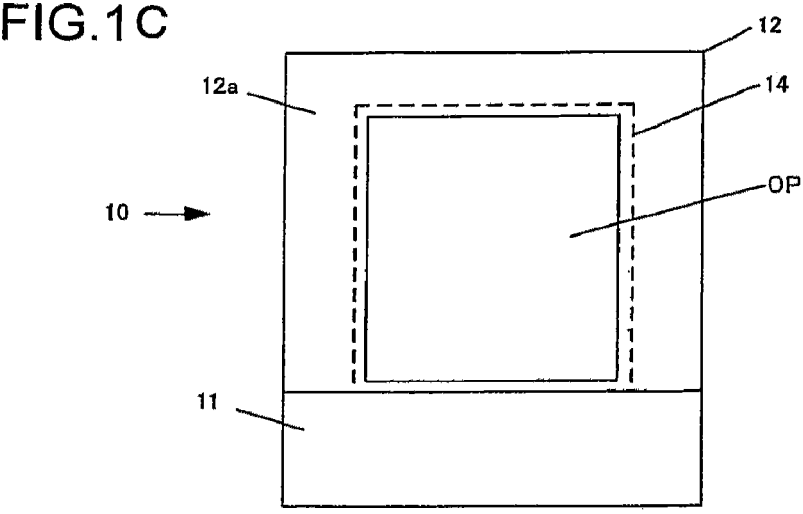

FIG. 1A through 1C are figures for explanation of a printer according to the first embodiment of the present invention. In FIGS. 1A and 1B, the printer includes a main body 11, a cover 12, and an output paper tray 13. A printer unit 120 is disposed within the main body 11. The cover 12 also serves as a tray for printing paper 14, and this is made so as to rotate freely about a rotation shaft O as center between a usage position shown in FIG. 1A and a storage position shown in FIG. 1B.

In the usage position shown in FIG. 1A, the printing paper 14 that has been loaded into the cover 12 is fed out therefrom in the downwards direction one sheet at a time by a paper supply mechanism not shown in the figures, and is supplied to the printer unit 120. The printer unit 120 prints upon the printing paper 14, and discharges the printing paper 14 upon which the printing has been finished to the output paper tray 13.

A projector (a projection unit 220) is also provided to the main body 11. The projection unit 220 is built so as, in the usage position of FIG. 1A, to project an optical image upon the printing paper 14 that is loaded into the cover 12. The surface of the cover 12 (the projection surface) is made to be approximately white in color, since, if no printing paper 14 is loaded into the cover 12, then the projection unit projects an optical image upon the cover 12.

As shown in FIG. 1C, an aperture OP that is slightly smaller than the size of the printing paper 14 is formed in the surface 12a of the cover 12, upon which the image from the projection unit 220 is projected. Accordingly, the projected image that is emitted from the projection unit 220 is projected directly upon the printing paper 14. Normally a plurality of sheets of printing paper 14 are stored in the cover 12, and, when printing starts, the sheets of printing paper 14 that are closest to the surface 12a are gradually pulled into the main body 11 according to the progress of printing. If the printing paper 14 in the cover 12 becomes exhausted, then the projected image is projected upon the surface 12b that opposes the surface 12a of the cover 12. It should be understood that it would also be acceptable not to provide the aperture or, so that the projected image was projected upon the surface 12a of the cover 12.

Figure 2:
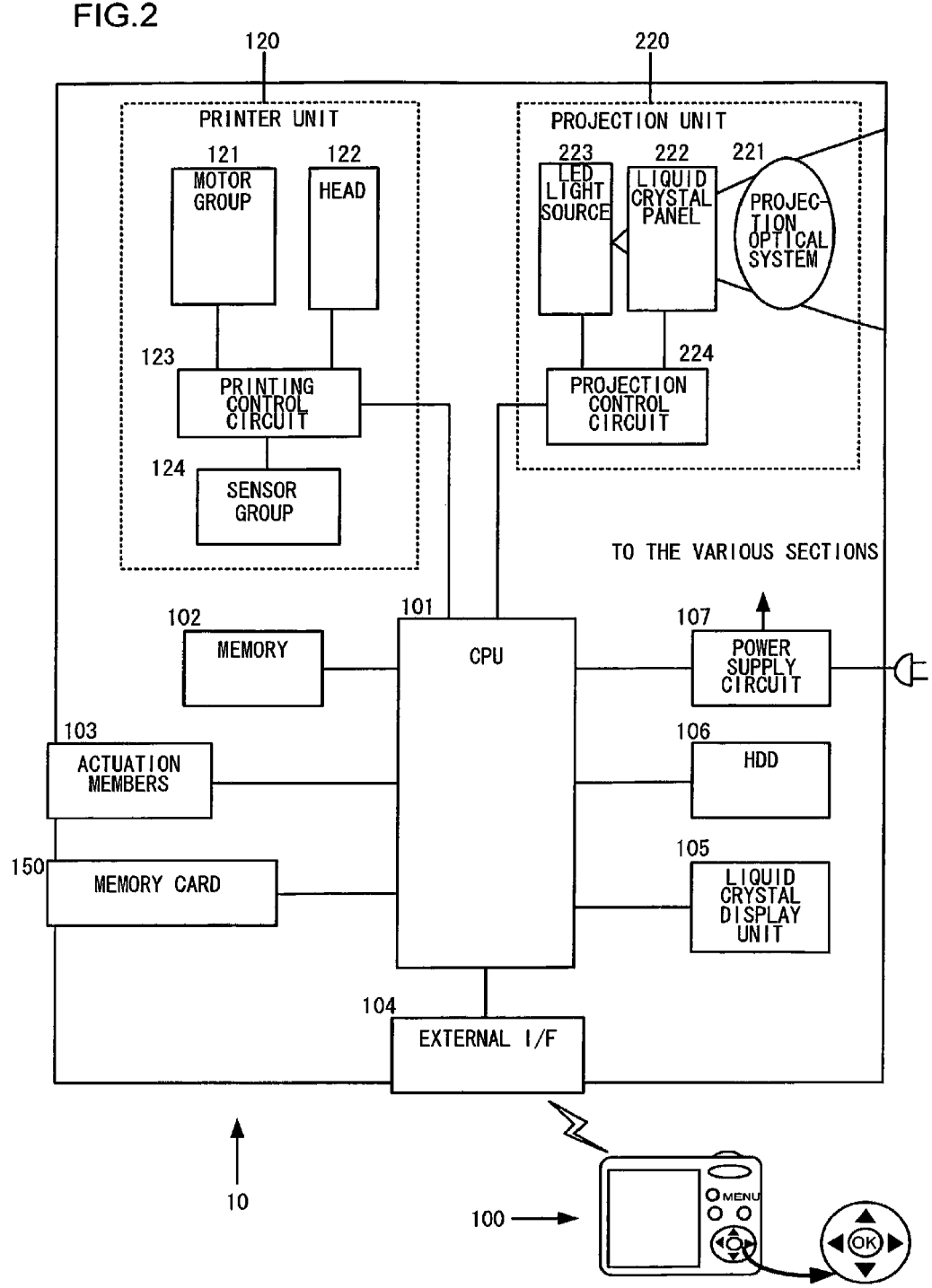
FIG. 2 is a block diagram for explanation of the structure of the printer.

FIG. 2 is a block diagram for explanation of the structure of the printer 10 of FIG. 1A through 1C. In FIG. 2, the printer 10 is provided with the printer unit 120, the projection unit 220, a CPU 101, a memory 102, actuation members 103, an external interface (I/F) circuit 104, a liquid crystal display unit 105, a hard disk drive (HDD) 106, and a power supply circuit 107; and a removable memory card 150 is also provided.

Based upon a control program, the CPU 101 performs predetermined calculations and the like using signals that are inputted from various ones of the sections that make up the printer 10, and outputs control signals to various sections of the printer 10, and thereby controls both the printing operation of the printer 10 and its projection operation. It should be understood that this control program is stored in a non-volatile memory not shown in the figures, within the CPU 101.

The memory 102 is used as a working memory of the CPU 101. The actuation members 103 send actuation signals to the CPU 101 corresponding to buttons that have been actuated by being depressed, or to switches that have been actuated. And the memory card 150 incorporates a non-volatile memory, and upon commands from the CPU 101 data can be written thereupon, stored therein, and read out therefrom.

Upon command from the CPU 101, the external interface circuit 104 transmits and receives commands and data to and from an external device (an electronic camera 100, a personal computer, or the like) via a cable or a wireless communication unit, not shown in the figures.

Upon command from the CPU 101, data can be written to the hard disk drive (HDD) 106, stored thereupon, and read out therefrom. Since the recording capacity of the hard disk drive (HDD) 106 is large as compared with the recording capacity of the memory card 150, accordingly it is possible to store a large number of image files or the like that the printer 10 has been commanded to print out. The power supply circuit 107 is, for example, an AC/DC conversion circuit or the like, and converts the commercial power supply to the DC power supply required for the various sections within the printer 10, and supplies the voltage after conversion to the various sections within the printer.

Upon command from the CPU 101, the liquid crystal display unit 105 displays information such as images or text or the like. Such text information is information that displays the operational state of the printer 10, an actuation menu, a message, or the like.

The printer unit 120 includes a motor group 121, a printer head 122, a printing control circuit 123, and a sensor group 124. The motor group 121 includes a motor for ejecting paper sheets, a motor that drives the printer head 122, and the like. The printer head 122 includes ink nozzles that perform printing and drawing of images upon a sheet of printing paper 14 that has been supplied. Upon command from the CPU 101, the printing control circuit 123 sends control signals to the motor group 121 and to the printer head 122. The sensor group 124 includes sensors that detect the presence or absence of the printing paper 14, the feed position of the printing paper 14, the remaining amount of ink, and the like, and the detection signal of each of these is outputted to the printing control circuit 123.

The projection unit 220 includes a projection optical system 221, a liquid crystal panel 222, a LED light source 223, and a projection control circuit 224. The LED light source 223 illuminates the liquid crystal panel 222 at a brightness that corresponds to the electrical current supplied. The liquid crystal panel 222 generates an optical image according to the drive signal from the projection control circuit 224. The projection optical system 221 projects the optical image that is emitted from the liquid crystal panel 222 towards the printing paper 14 or the cover 12. Upon command from the CPU 101, the projection control circuit 224 sends control signals to the LED light source 223 and to the liquid crystal panel 222. And, when the cover 12 is in the storage position shown in FIG. 1B, the CPU 101 does not cause the projection unit 220 to perform projection.

Figure 3:
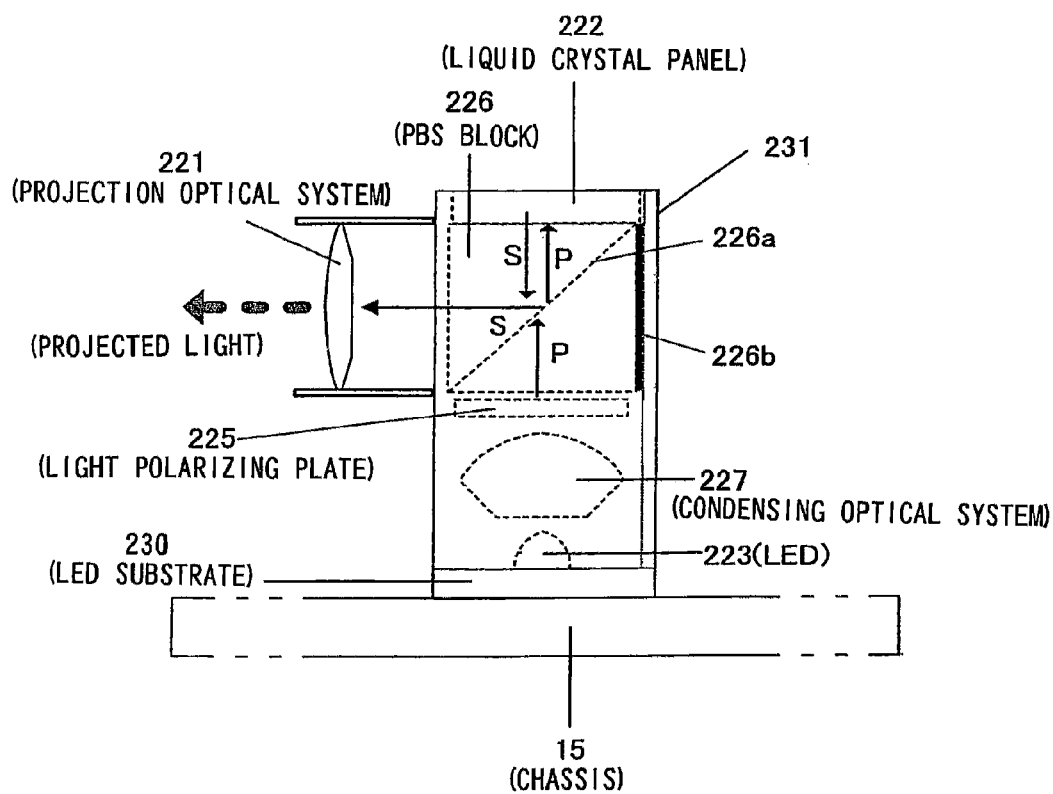
FIG. 3 is an enlarged figure showing an optical system of a projection unit.

In this embodiment, a reflective type liquid crystal panel is used for the liquid crystal panel 222, as shown in FIG. 3. A transparent type liquid crystal panel may be used as the liquid crystal panel 222. It should be understood that, instead of the liquid crystal panel 222, a DMD may also be used.

The CPU 101 also performs trapezoidal skewing compensation processing in order to compensate the trapezoidal deformation of the image projected by the projection unit 220. When the projection unit 220 is performing projection, the CPU 101 sends projection data to the projection control circuit 224 after having performed this trapezoidal compensation processing thereupon.

The printer 10 performs printing of images and text. The printer 10 prints the image that the CPU 101 designates from among a replayed image of image file recorded upon the memory card 150 that has been loaded, a replayed image of image file that has been transmitted from an external device via the external interface circuit 104, and a replayed image of image file that has been stored upon the hard disk drive (HDD) 106. And the printer 10 prints, as text, text information that is recorded upon the memory card 150, or text information that has been transmitted from an external device, or the like.

Figure 4:
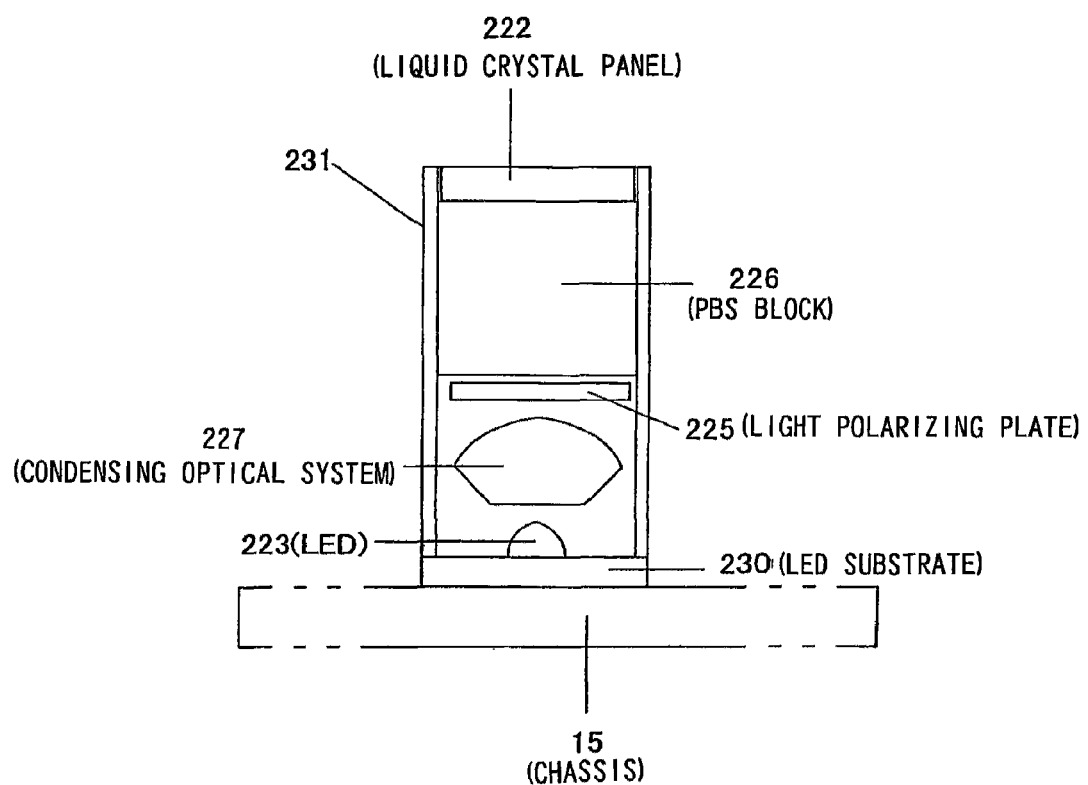
FIG. 4 is a figure showing the optical system of FIG. 3 as seen from its left side.

The details of the projection unit 220 will now be explained with reference to FIG. 3 and FIG. 4. FIG. 3 is an enlarged figure showing the optical system of the projection unit 220. And FIG. 4 is a figure showing the optical system of FIG. 3 as seen from its left side, with the projection optical system 221 omitted.

The optical system of the projection unit 220 is build as a four cornered columnar shape module (hereinafter termed a module) whose bottom surface is an approximately about 10 mm by 10 mm square. The lengthwise direction of this module is oriented in the vertical direction, and the bottom surface of the module (i.e. its lower surface) and a chassis 15 of the main body 11 (see FIG. 1A through 1C) that is made from a metal having high thermal conductivity are joined together. It should be understood that, in FIG. 3 and FIG. 4, in order to make it easier to understand the internal structure from these figures, the size of the four cornered column in its lengthwise direction is shown as longer than it actually is.

The module includes a white colored LED 223 (a LED substrate 230), a condensing optical system 227, a light polarizing plate 225, a PBS (polarized beam splitter) block 226, the liquid crystal panel 222, and the projection optical system 221. In this structure, among the members described above, all of the members except for the projection optical system 221 are integrated within a shell member 231. In concrete terms, the LED substrate 230 is provided at a lower open surface portion of the member 231, which has been manufactured by bending a thin plate made from aluminum. The LED substrate 230 is made as an aluminum plate, and the LED 223, which is a light emitting element, is implemented upon a wiring pattern that is formed upon an insulating layer upon that substrate.

Furthermore, the condensing optical system 227 and the PBS block 226 are adhered to the shell member 231. The PBS block 226 is a polarized light beam splitter in which a polarized light separation portion 226a, which subtends an angle of 45° with respect to the incident optical axis, is sandwiched between two triangular prisms. Non reflective treatment, for example black coloring treatment or the like is performed upon the surface 226b of this PBS block 226.

A light polarizing plate 225 is disposed upon the lower side of the PBS block 226 (the surface thereof on the side of the condensing optical system 224). And the liquid crystal panel 222 that is constituted by a reflective type liquid crystal element (LCOS) is disposed upon the upper side of the PBS block 226.

The chassis 15 constitutes the frame of the main body 11. The surfaces of the chassis 15 and of the LED substrate 230 are joined together so as to conduct heat well from a heat generating member (in this embodiment, the LED substrate 30). In concrete terms, a filler material whose thermal conductivity is high is charged between the surface of the chassis 15 and the LED substrate 30, or a thermally conductive sealing member is sandwiched between them. By forming this high efficiency thermal conduction path, it is possible to suppress elevation of the temperature of the projection unit 220.

With the module of the structure described above, drive electrical current is supplied to the LED 223 upon the LED substrate 230 from the projection control circuit 224 via a harness and a wiring pattern not shown in the figures. The LED 223 emits light of a brightness corresponding to the drive electrical current towards the condensing optical system 227. The condensing optical system 224 makes the LED light approximately parallel, and directs it to be incident upon the light polarizing plate 225. The light polarizing plate 225 converts this incident light into linearly polarized light or extracts linearly polarized light from this incident light, and emits the polarized light after conversion (or extraction) towards the PBS block 226.

The polarized light flux that is incident upon the PBS block 226 (for example, P polarized light) passes through the PBS block 226 and illuminates the liquid crystal panel 222. The liquid crystal panel 222 is made up of a plurality of picture elements upon which red, green, and blue filters are formed, and is driven so as to create a color image. When the light that passes through the liquid crystal layer of the liquid crystal panel 222 is incident upon the liquid crystal panel 222, it progresses in the upward direction in FIG. 3 through this liquid crystal layer, and after having been reflected from the reflective surface of the liquid crystal panel 222, progresses in the downward direction in FIG. 3 through the liquid crystal layer and is emitted from the liquid crystal panel 222, to be incident upon the PBS block 226 for a second time. Since the liquid crystal layer functions as a phase plate when voltage is applied to it, this light that is incident for a second time upon the PBS block 226 is a mixture of modulated light that is S polarized light, and unmodulated light that is P polarized light. The PBS block 226 reflects (bends) with the polarized light separation portion 226a only the modulated light, that is the S polarized light component, in this light flux that is incident for a second time, and emits this component as projection light towards the projection optical system 221 at the left of the figure.

The Main Processing

Figure 5:
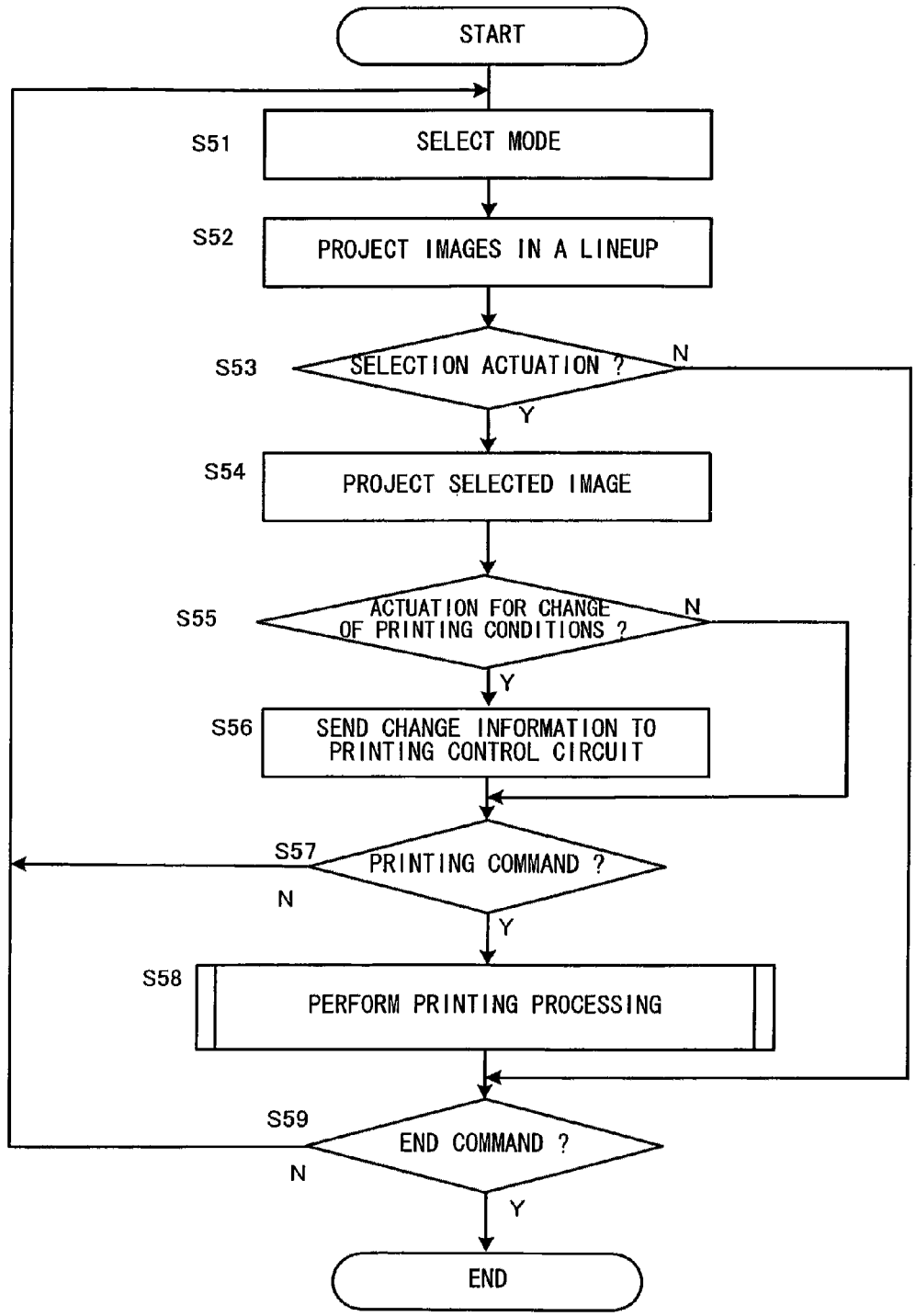
FIG. 5 is a flow chart showing an example of main processing performed by a CPU.

In the following, the flow of the printing operation will be explained with reference to the flow chart of FIG. 5. FIG. 5 is a flow chart showing an example of this main processing that is performed by the CPU 101. The processing of FIG. 5 is started when the main switch of the printer 10 is turned ON.

In a step S51 of FIG. 5, the CPU 101 performs mode selection, and then the flow of control proceeds to a step S52. This printer 10 has a still image printing mode and a moving image printing mode. The CPU 101 sets the still image mode if an actuation signal is inputted from an actuation member 103 to command the still image mode, and sets the moving image mode if an actuation signal is inputted to command the moving image mode. It should be understood that it would also be acceptable to arrange for information that specifies the Operation mode to be applied to be recorded within the Exif information in the image file, and to determine the mode for operating upon the image file according to this recorded information. In this case, the actuation for selecting and setting the operation mode to be applied from the still image mode and the moving image mode would be unnecessary.

The Still Image Mode

The case when the still image mode is set will now be explained. In the step S52, the CPU 101 causes the projection unit 220 to project a thumbnail image for each of the still image files (for example, files of a format whose extension is specified as ".JPG") that are stored within a folder that has been commanded by an actuation signal from an actuation member 103 (this folder being defined within the memory card 150, within the memory 102 in which data that has been transmitted from an external device has been stored, or within the hard disk drive (HDD) and then the flow of control proceeds to a step S53. In concrete terms, the CPU 101 reads out the data for these thumbnail images and extracts it in a predetermined region in the memory 102, and after this extraction, along with sending this data to the projection control circuit 224, it commands the projection control circuit 224 to perform projection thereof.

Figure 7:
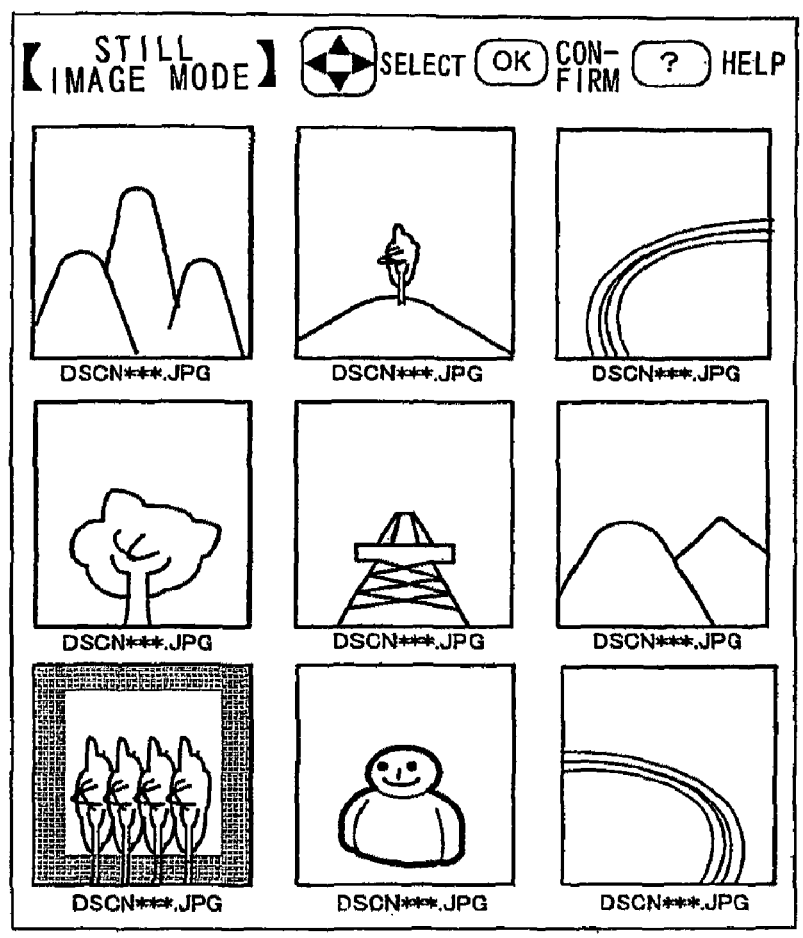
FIG. 7 is a figure showing an example of an image being projected upon printing paper in the still image mode.

FIG. 7 is a figure showing an example of an image that is projected upon a sheet of printing paper 14 that has been loaded into the cover 12. In FIG. 7, a plurality of thumbnail images are projected with being arranged in a lineup as a predetermined arrangement. If nine thumbnail images or more are present, the page that is being projected is changed over for every nine images. The CPU 101 projects a cursor (the thick frame in FIG. 7) superimposed over the thumbnail image at a position designated by an actuation signal from an actuation member 103 (that for example may be a cruciform key). It should be understood that the number of thumbnail images that are projected at the same time is not limited to nine, that has been given by way of example; this number may be four images or twenty images.

Figure 8:
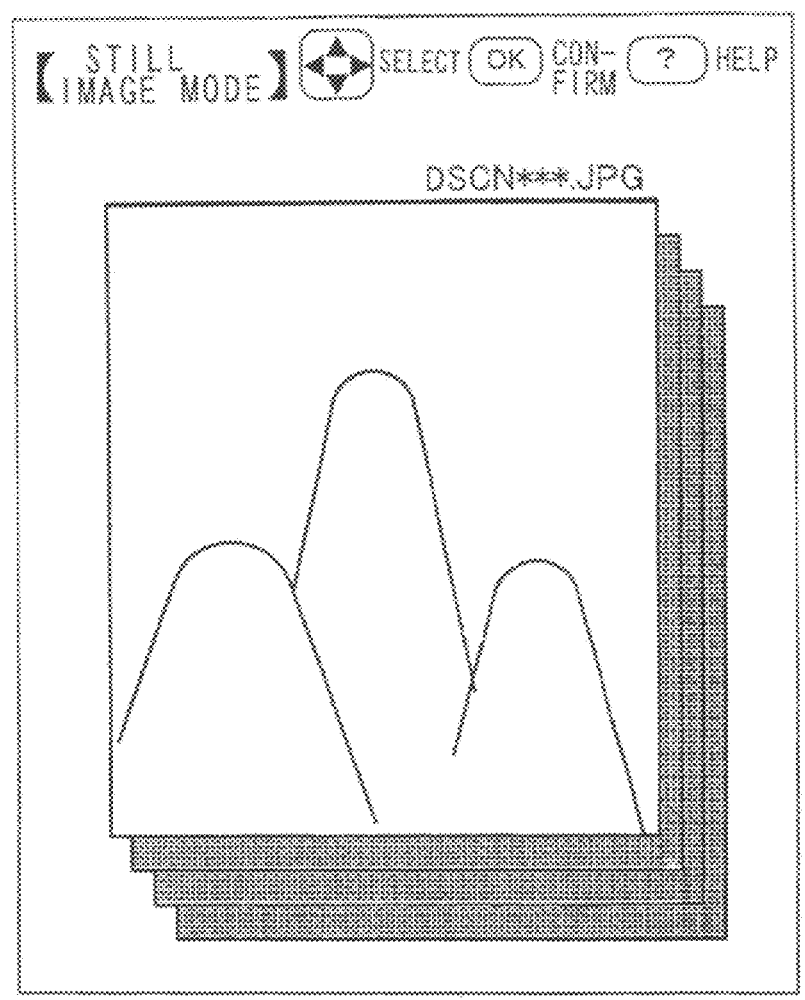
FIG. 8 is a figure showing an example of an image being projected upon printing paper in the still image mode.

When an actuation signal that designates projection of one image at a time is inputted from an actuation member 103, the CPU 101 changes over to the projected images shown by way of example in FIG. 8. According to FIG. 8, the thumbnail image that corresponds to any one of the still image files is projected as enlarged. The CPU 101 changes over the thumbnail image that is being projected in order, corresponding to actuation signals from an actuation member 103 (for example, a cruciform key). And, when an actuation signal that designates the projection of nine images on a single screen is inputted from an actuation member 103, then the CPU 101 changes back, for a second time, to the projected images in the predetermined arrangement shown by way of example in FIG. 7.

In the step S53, the CPU 101 makes a decision as to whether or not selection actuation for an original image has been performed. If an actuation signal from an actuation member 103 (that may for example be an OK button) is inputted, then the CPU 101 reaches an affirmative decision in this step S53 and the flow of control proceeds to a step S54, while if no actuation signal is inputted from the OK button, then the CPU 101 reaches a negative decision in this step S53 and the flow of control proceeds to a step S59.

In the step S54, the CPU 101 projects the selected image with the projection unit 220, and then the flow of control proceeds to a step S55. In concrete terms, if the projected images shown by way of example in FIG. 7 are being projected, then, at the time point that an actuation signal is inputted from the OK button, the original image that corresponds to the thumbnail image over which the cursor is currently superimposed is taken as being the selected image. Moreover, if the projected images shown by way of example in FIG. 8 is being projected, then, at the time point that an actuation signal is inputted from the OK button, the original image for the image file that corresponds to the thumbnail image being projected is taken as being the selected image. The CPU 101 reads out the selected image, in other words the original image data that is taken as the image subject to be printed, extracts it in a predetermined region in the memory 102, and, along with sending the data after extraction to the projection control circuit 224, also commands the projection control circuit 224 to perform projection thereof.

Figure 9:
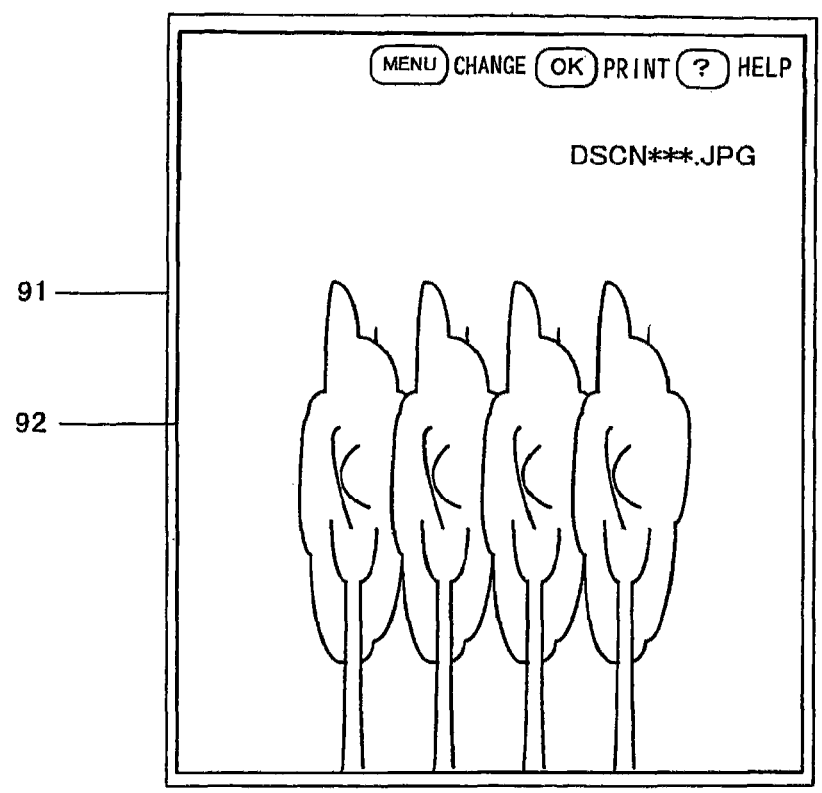
FIG. 9 is a figure showing an example of an image being projected upon printing paper in the still image mode.

FIG. 9 is a figure showing an example of an image that is being projected upon a sheet of printing paper 14 loaded into the cover 12. In FIG. 9, a frame 91 that shows the size of the printing paper and a frame 92 that shows the printing range are both included in the projected contents, and the size of the projected image is controlled to be smaller than the printing size. The CPU 101 specifies the projection conditions to the projection control circuit 224, so as to recreate the printing conditions that are being used by the printer unit 120 (for example, the size of the paper being used, the printer magnification, the printing position (the blank margins on the printing paper), the hue of the printing color, the strength or weakness of the printing, and the like) in the projected image. It should be understood that, in this recreation of the printing conditions with the projected image, it would also be acceptable to arrange to recreate only those among the above described items that have been designated.

If a signal that indicates that the printing paper 14 is not loaded into the cover 12, or that there is a feed anomaly with the printing paper 14, or that the remaining amount of ink has decreased, or the like has been received by the printing control circuit 123, then the CPU 101 causes the projection control circuit 224 to project warning information related to printing instead of, or overlaid over the selected image. This warning information that is included in the projected image may be a message or a mark.

In the step S55, the CPU 101 decides whether or not actuation has been performed to change the printing conditions. If an actuation signal is inputted from an actuation member 103 (for example, a MENU button), then the CPU 101 reaches an affirmative decision in this step S55 and the flow of control proceeds to a step S56, whereas if no actuation signal is inputted from the MENU button then the CPU 101 reaches a negative decision in this step S55 and the flow of control is transferred to a step S57.

In the step S56, the CPU 101 transmits change information for the printing conditions to the printing control circuit 123, according to the MENU actuation signal from the actuation member 103, and then the flow of control proceeds to the step S57. It should be understood that, in the case of a negative decision in the step S55, such transmission of information to the printing control circuit 123 would be useless, since the printing control circuit 123 is to use the default printing conditions.

In the step S57, the CPU 101 decides whether or not printing command actuation has been performed. If an actuation signal is inputted from an actuation member 103 (for example, the OK button), then the CPU 101 reaches an affirmative decision in this step S57 and the flow of control proceeds to a step S58, whereas if no actuation signal is inputted from the OK button then the CPU 101 reaches a negative decision in this step S57 and the flow of control returns back to the step S51.

In the step S58 the CPU 101 performs printing processing, and then the flow of control proceeds to a step S59. The details of this printing processing will be described hereinafter. In the step S59, the CPU 101 decides whether or not termination has been designated. If an actuation signal for designating termination is inputted from an actuation member 103, then the CPU 101 reaches an affirmative decision in this step S59 and the processing of FIG. 5 is terminated, whereas if no actuation signal for designating termination is inputted from the actuation member 103, then the CPU 101 reaches a negative decision in this step S59, and the flow of control returns back to the step S51.

Printing Processing

The details of printing processing during the still image mode will now be explained with reference to the example flow chart shown in FIG. 6. In a step S61 of FIG. 6, the CPU 101 commands the printing control circuit 123 to start printing, and then the flow of control proceeds to a step S62. In concrete terms, the CPU 101 sends to the printing control circuit 123, as the selected image, the original image data that is extracted in the predetermined region in the memory 102.

In the step S62, the CPU 101 commands the projection control circuit 224 to project a black image (the initial optical image), and then the flow of control proceeds to a step S63. Due to this, a state is established in which the projected image shown by way of example in FIG. 9 is temporarily blacked out, and cannot include any printing information (such as the selected image). It should be understood that it would also be acceptable to project some color other than black (for example blue color). In the step S63, the CPU 101 commands the projection control circuit 224 to project the top line of the selected image, and then the flow of control proceeds to a step S64. The projection width of this one line is controlled to be approximately equal to the printing width of one line that is printed upon the printing paper 14 by the printer unit 120.

In the step S64, the CPU 101 decides whether or not the printing of one line has been completed. If a signal indicating that the printing of one line has been completed is inputted from the printing control circuit 123, then the CPU 101 reaches an affirmative decision in this step S64 and the flow of control proceeds to a step S65, whereas if no signal that shows that the printing of one line has been completed is inputted, then the CPU 101 reaches a negative decision in this step S64, and this decision processing is repeated.

In the step S65, the CPU 101 commands the projection control circuit 224 to perform projection of the next one line as well for the selected image that is being projected, and then the flow of control proceeds to a step S66. Due to this, the printing information that is included in the projected image (the selected image) is widened by one line.

In the step S66, the CPU 101 makes a decision as to whether or not the printing of one line has been completed. If a signal indicating that the printing of the next one line has been completed is inputted from the printing control circuit 123 then the CPU 101 reaches an affirmative decision in this step S66 and the flow of control proceeds to a step S67, whereas if no signal that shows that the printing of one line has been completed is inputted, then the CPU 101 reaches a negative decision in this step S66, and this decision processing is repeated.

In the step S67, the CPU 101 makes a decision as to whether or not all of the lines of the selected image are being projected. If a signal indicating that all of the lines are being projected (in other words, that all of the printing information is included in the projected image) is inputted from the projection control circuit 224, then the CPU 101 reaches an affirmative decision in this step S67 and the flow of control proceeds to a step S68, whereas if no signal that shows that all of the lines are being projected is inputted, then the CPU 101 reaches a negative decision in this step S67, and the flow of control returns to the step S65.

Figure 10:
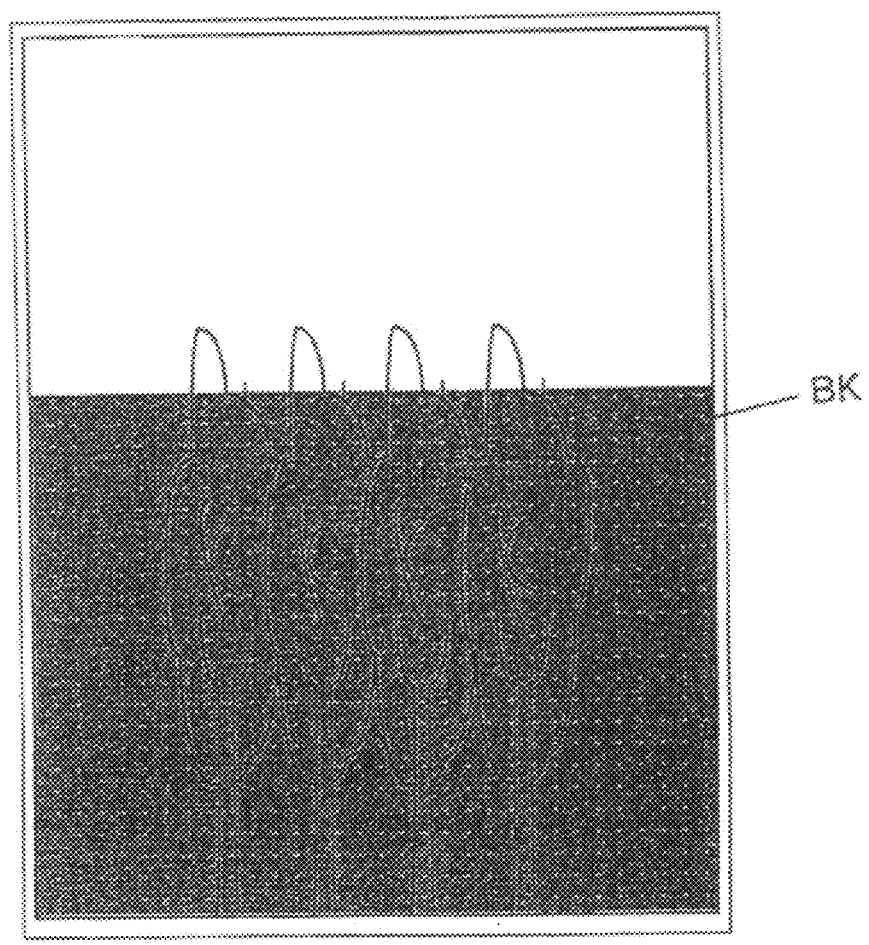
FIG. 10 is a figure showing an example of a projected image that is being widened one line at a time.

FIG. 10 is a figure showing an example of a projected image that is being widened one line at a time. The selected image that is included in the projected image is widened by one line at a time from its top line in synchronization with the printing speed of the printer unit 120, and thus the range of the selected image is gradually widened. Along with this widening of the range of the selected image, the blacked out region BK included in the projected image is gradually narrowed down.

Figure 6:
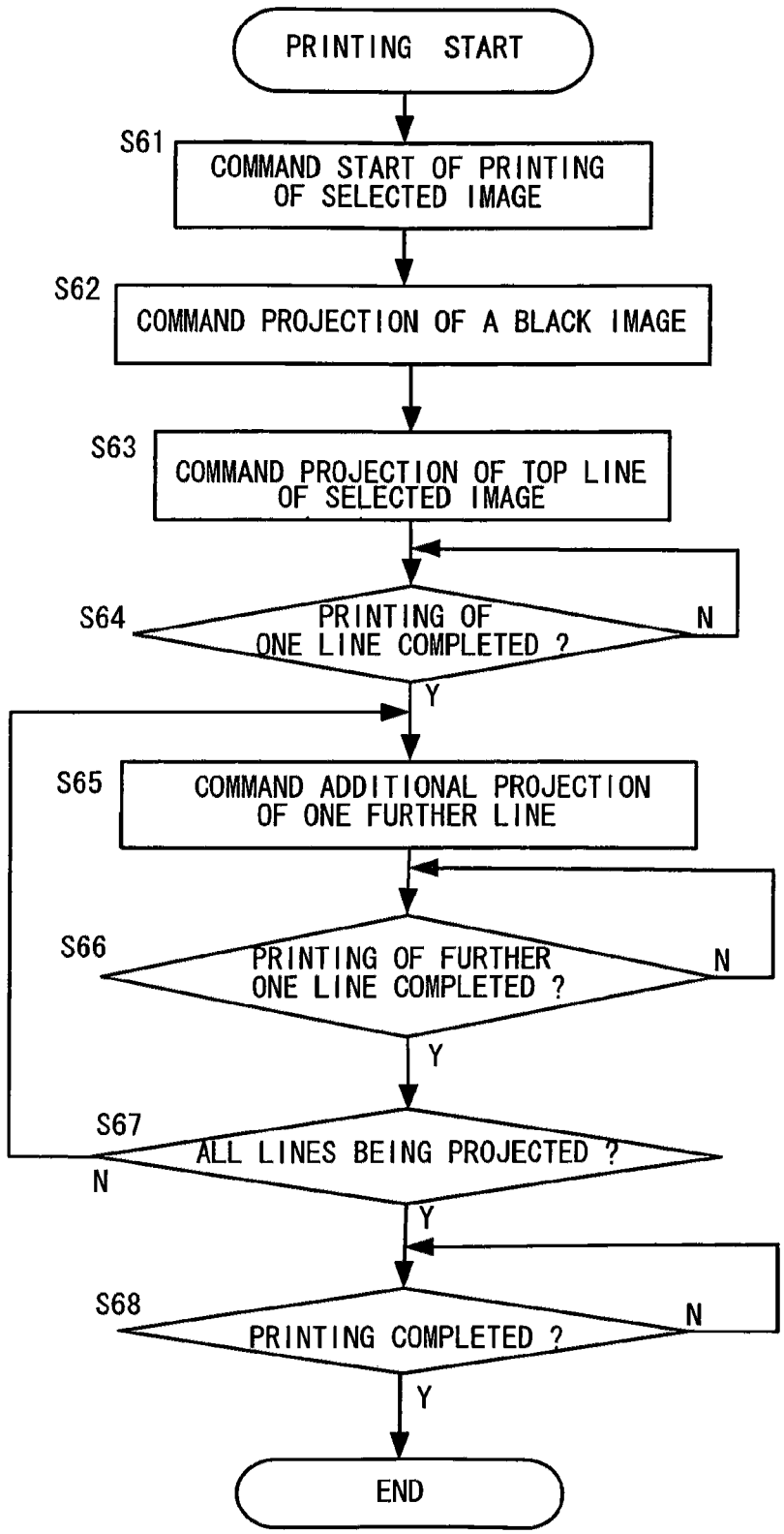
FIG. 6 is a flow chart showing an example of details of printing processing in a still image mode.

In the step S68 of FIG. 6, the CPU 101 makes a decision as to whether or not printing has been completed. If a signal is inputted from the printing control circuit 123 that indicates that all of the lines are printed and that the ejection of the sheet 14 of printing paper has been completed, then the CPU 101 reaches an affirmative decision in this step S68 and commands the projection control circuit 224 to terminate projection (i.e. to turn OFF the LED 223), and then the processing of FIG. 6 terminates. On the other hand, if no signal is being inputted that indicates that printing of all of the lines has been terminated and that the ejection of the printing paper has been completed, then the CPU 101 reaches a negative decision in this step S68, and this decision processing is repeated.

The Moving Image Mode

The case when the moving image mode is set will now be explained. In the step S52 of FIG. 5, the CPU 101 causes the projection unit 220 to project a representative image (for example the leading image) representing the plurality of frames that make up each of the moving images relating to the moving image files (for example, files of a format whose extension is specified as ".MOV") that are stored within a folder that has been commanded by an actuation signal from the actuation member 103 (and that is defined within the memory card 150, within the memory 102 in which data that has been transmitted from an external device has been stored, or within the hard disk drive (HDD) 106).

Figure 11:
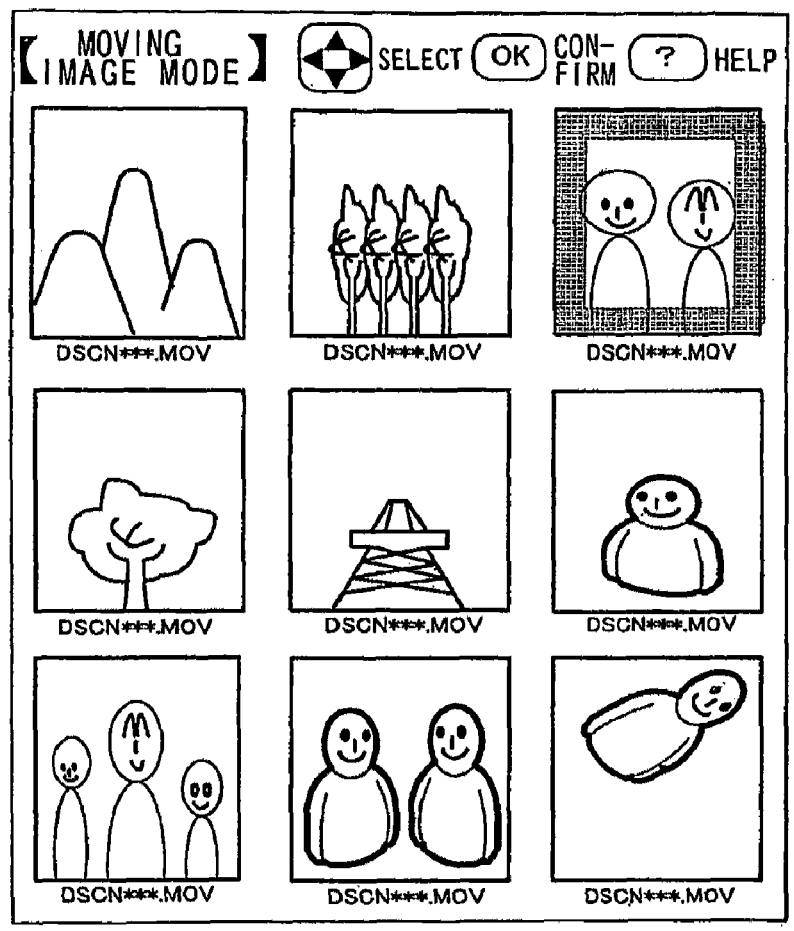
FIG. 11 is a figure showing an example of an image being projected upon printing paper in a moving image mode.

FIG. 11 is a figure showing an example of an image that is projected upon a sheet of printing paper 14 that has been loaded into the cover 12. In FIG. 11, representative images for a plurality of moving image files are projected with being arranged in a lineup as a predetermined arrangement. If nine representative images (in other words, moving image files) or more are present, the page that is being projected is changed over for every nine images. The CPU 101 projects a cursor (the thick frame in FIG. 11) superimposed over the representative image at a position designated by an actuation signal from an actuation member 103 (that for example may be a cruciform key). It would also be acceptable for the number of representative images that are projected at the same time not to be limited to nine.

In a similar manner to that for the case of the still image mode, when an actuation signal that designates projection of one image at a time is inputted from an actuation member 103, the CPU 101 changes over to a similar projected image to the one shown in FIG. 8. In other words, the representative image that corresponds to any one of the moving image files may be enlarged and projected. In this case, the CPU 101 changes over the representative image that is being projected in order, corresponding to actuation signals from an actuation member 103 (for example, a cruciform key). And, when an actuation signal that designates the projection of nine images on a single screen is inputted from an actuation member 103, then the CPU 101 changes back, for a second time, to the projected images in the predetermined arrangement shown by way of example in FIG. 11.

In this moving image mode, the CPU 101 commands the printer unit 120 to print the representative image for the selected moving image file while performing the operation of replaying (projecting) this moving image file with the projection unit 220.

Figure 12:
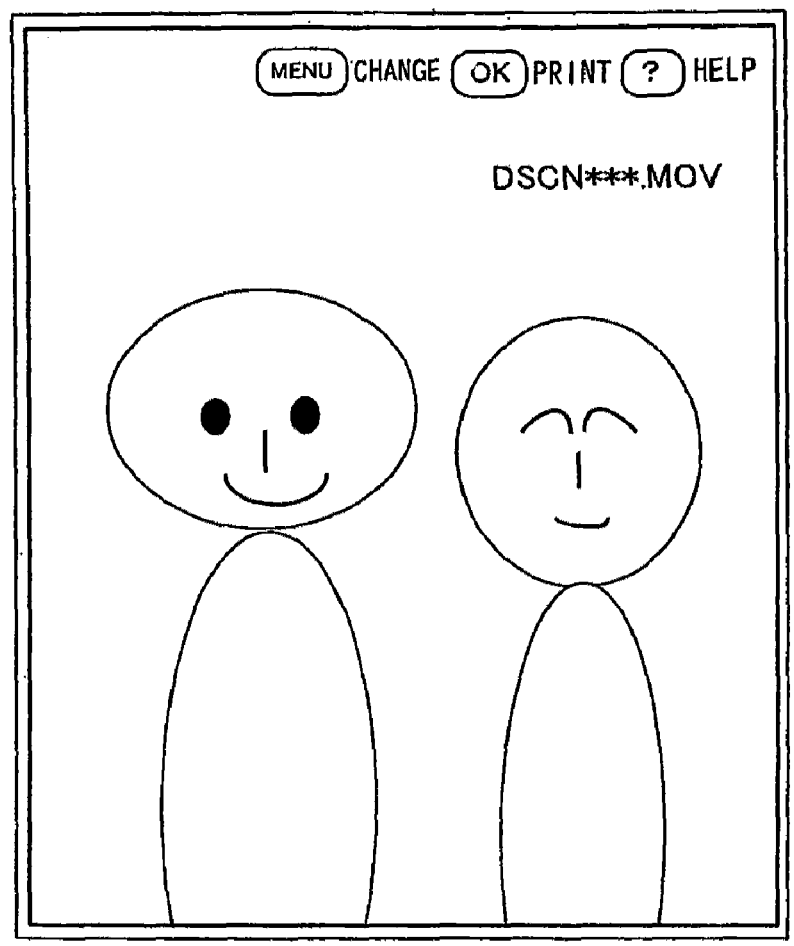
FIG. 12 is a figure showing an example of an image being projected upon printing paper in the moving image mode.

FIG. 12 is a figure showing an example of the image that is projected upon the printing paper 14 in the step S54 of FIG. 5 during the moving image mode. In FIG. 12, both a frame that shows the size of the printing paper and a frame that shows the printing range are included in the projection contents, and the size of the projected image is controlled to be smaller than the printing size. The CPU 101 commands projection conditions to the projection control circuit 224 so as to recreate the printing conditions used by the printer unit 120 (for example, the size of paper used, the printing magnification, the printing position (the blank margins on the printing paper), the hues of the printing colors, the intensities of the printing colors and the like) in the projected image. It should be understood that, in this recreation of the printing conditions in the projected image, it would also be acceptable to recreate only those among the above described items that have been designated.

Printing Processing

The details of printing processing during the moving image mode will now be explained with reference to the example flow chart shown in FIG. 13. In a step S71 of FIG. 13, the CPU 101 commands the projection control circuit 224 to start moving image replay of the moving image file that has been selected as the subject for printing (projection), and then the flow of control proceeds to a step S72. In concrete terms, the CPU 101 sends to the projection control circuit 224 the frame images that make up the moving image file stored in order in a predetermined region in the memory 102, sequentially in order from the image data for its first frame (for example at a frame rate of 30 frames per second). By doing this, the projection unit 220 starts the moving image replay from the first frame sequentially.

In the step S72, the CPU 101 commands the printing control circuit 123 to print the representative image, and then the flow of control proceeds to a step S73. In concrete terms, the CPU 101 sends the representative image data stored in a predetermined region of the memory 102 to the printing control circuit 123.

In the step S73, the CPU 101 makes a decision as to whether or not the moving image replay has ended. If a signal indicating that the projection of the last frame has been completed is inputted from the projection control circuit 224, then the CPU 101 reaches an affirmative decision in this step S73 and the flow of control proceeds to a step S74, whereas if no signal that shows that the projection of the last frame has been completed is inputted, then the CPU 101 reaches a negative decision in this step S73, and the above decision processing is repeated.

In the step S74, the CPU 101 makes a decision as to whether or not printing has been completed. If a signal is inputted from the printing control circuit 123 that indicates that the representative image is printed and that the ejection of the sheet of printing paper 14 has been completed, then the CPU 101 reaches an affirmative decision in this step S74 and commands the projection control circuit 224 to terminate projection (i.e. to turn OFF the LED 223), and then the processing of FIG. 13 terminates. On the other hand, if no signal is being inputted that indicates that printing has been terminated and that the ejection of the printing paper has been completed, then the CPU 101 reaches a negative decision in this step S74, and the above decision processing is repeated.

According to the first embodiment as explained above, the following beneficial operational effects are obtained.

(1) The printer unit 120 and the projection unit 220 are provided to the printer 10, and it is arranged to project the image that is to be the subject of printing via the projection unit (in the step S54) before the printer unit 120 starts printing this image that is to be the subject of printing. Due to this, the operator is able to determine whether or not to cause the printer 10 to perform printing, having in advance confirmed the details of the image to be printed (i.e. of the image that is to be the subject of printing) from the large projected image.

(2) The projection unit 220 does not project the image that is to be the subject for printing upon the sheet of printing paper 14 that is being printed, but rather upon the cover 12 (or upon the printing paper 14 that is loaded thereinto). Since the surface upon which projection is being performed and the surface upon which printing is being performed are different, accordingly it is possible to continue projection by the projection unit 220, not only before printing by the printer unit 120 (of course), but also during printing and after printing. Moreover, since the printing paper 14 is usually white in color, accordingly it is simple to confirm the hue, as compared to the case of projection upon a surface of a different color.

(3) Since the projected image is projected towards the cover 12, which constitutes a portion of the body of the printer 10, accordingly it is not necessary to provide any dedicated projection screen. Moreover, it is possible to store the cover 12 away in a compact manner, since it is arranged to rotate the cover 12 to its storage position (see FIG. 1B) around the rotation shaft O as an axis.

(4) Since the size of the image that is projected by the projection unit 220 is controlled to be smaller than the range of printing by the printer unit 120, accordingly there is no fear that the projected image will fall outside the actual size of the printing paper 14.

(5) Since it is arranged for both the frame that shows the range of the printing paper 14 and also the frame that shows the printing range of the printer unit 120 to be included in the optical image that is projected by the projection unit 220, it is possible to check the blank printing margins in advance on the projected image.

(6) since the project-ion conditions of the image that is projected by the projection unit 220 are controlled so as to recreate the printing conditions used by the printer unit 120 (the size of paper being used, the printing magnification, the printing position, the hue of the printing colors, and the intensity of printing), accordingly it is possible to check the printing image (the printing situation) in advance on the projected image.

(7) During printing by the printer unit 120, it is arranged to project (in the steps S62 through S67) a optical image from the projection unit 220 that shows the state of progression of the printing (for example, a projected image in which the range of the image that is the subject of printing widens gradually). Due to this, it is possible for the operator to know the state of progression of the printing from this projected image.

(8) Control is exerted so that, after the projected image that is projected from the projection unit 220 during printing by the printing unit 120 has been temporarily blacked out after printing starts, subsequently, along with the progression of the printing by the printer unit 120, the range of the image that is the subject for printing projected from the projection unit 220 is widened one line at a time, each time printing of one line is completed. As a result, it is possible to show in real time how far the printing has progressed.

(9) Since control is exerted to terminate projection by the projection unit 220 when printing by the printer unit 120 is completed, accordingly it is possible for the user reliably to know when printing has been completed.

(10) Since it is arranged to include warning information that indicates a feed anomaly of the printing paper 14, or decrease of the remaining amount of ink or the like, in the image that is projected from the projection unit 220 during printing by the printer unit 120, accordingly it is possible for the user to be informed immediately of the occurrence of an anomaly.

(11) The printer unit 120 and the projection unit 220 are included in the printer 10, and it is arranged to cause the printer unit 120 to print (in the steps S52 through S58) the image that has been ordered from among a plurality of thumbnail images that are being projected by the projection unit 220. By doing this, the operator is able to order the image that is to be the subject for printing, while looking at the plurality of images that have been projected at large size.

(12) Since it is arranged for the projection unit 220 to project the plurality of thumbnail images that have been replayed using the plurality of sets of image data in a predetermined arrangement, it is possible for the operator to order the image that is to be the subject of printing while looking at the plurality of images that are being projected at large size, all at one time.

(13) Since it is arranged for the projection unit 220 to increase the size of the plurality of thumbnail images that are replayed using the plurality of sets of image data, and to project them one image at a time in order, it is possible for the operator to order the image that is to be the subject for printing while checking the images that are projected at large size in order.

(14) Since the hard disk drive (HDD) 106 is provided to the printer 10, and it is arranged for the projection unit 220 to project the plurality of thumbnail images that are replayed using the image data accumulated upon this hard disk drive, it is possible for the operator to order the image that is to be the subject for printing from among a large number of images.

(15) Since it is arranged to accumulate the image data that the printer 10 has printed in the past upon the hard disk drive (HDD) 106, it is possible to perform printing for a second time in a simple manner, and the requirement for reading in the image data to the printer 10 from the exterior each time printing thereof is to be performed is eliminated.

(16) Since it is arranged to receive the designation for ordering the image that is to be the subject of printing by an actuation signal from an actuation member 103, it is possible for the operator directly to designate the image that is to be the subject of printing upon the printer 10 by actuating the actuation member 103 while checking the images that are projected at large size, in order.

(17) This printer 10 that includes the printer unit 120 and the projection unit 220 has a moving image printing mode in which it prints and projects an image of a moving image file, and a still image printing mode in which it prints or projects an image of a still image file, and it is arranged to control the printer unit 120 and the projection unit 220 according to the printing mode that is selected. Due to this, it is possible to output an image in an appropriate manner, irrespective of whether it is a still image or a moving image.

(18) It is arranged for the printer 10 automatically to select either the moving image printing mode if the image that has been designated to be the subject of printing is included in a moving image file, or the still image printing mode if the image that has been designated to be the subject of printing is included in a still image file. Due to this, it is possible to make it unnecessary to perform any actuation for selecting the printing mode according to the image that is to be the subject for printing.

(19) Since, in the case of the moving image printing mode, the projection unit 220 replay projects the moving image that has been designated as the image that is the subject of printing, it is possible to output this moving image as the projected image. Moreover, since the printer unit 120 prints a representative image of the moving image that has been designated as the image that is to be the subject for printing, it is possible to output one frame of the moving image as the printed image.

(20) Since it is arranged for the printer unit 120 to start the printing after reception of the printing command (an affirmative decision in the step S57), the printing processing is not started while the operator is still checking the projected image.

Variant Embodiment #1

The flow chart of FIG. 5 is one that shows an example of the flow of processing when selecting the images that are to be the subject for printing one image at a time, and printing the image that has been selected one image at a time. Instead of this, it would also be acceptable to arrange to perform the selection of the image that is to be the subject for printing for a plurality of images all together, and to print this plurality of images that have thus been selected all together.

Variant Embodiment #2

In the case of the still image mode, it would also be acceptable to arrange to perform the following operation, other than the operation described above. When, in the mode selection processing of the step S51, the CPU 101 sets the still image mode, any one of a still image mode #1 through a still image mode #3 is further selected and set according to an actuation signal from an actuation member 103.

The still image mode #1 is a mode in which operation is performed in the mode shown in FIGS. 5 and 6 and described above. The still image mode #2 is a mode in which, during printing by the printer unit 120, projection by the projection unit 220 is not performed. In concrete terms, after having commanded the printing control circuit 123 to start printing in the step S61 of FIG. 6, the CPU 101 skips the processing from the step S62 through the step S67, and causes the projection unit 220 to stop projection until in the step S68 a decision is made that printing has ended.

And the still image mode #3 is an operational mode in which so called "slide show" projection is performed. In this mode, the CPU 101 causes the projection unit 220 to project images that have been selected sequentially one image at a time at predetermined intervals, and does not perform printing with the printer unit 120.

It should be understood that it would also be acceptable to arrange to record information that specifies the operational mode to be applied within the Exif information for an image file, and to arrange to determine the mode of operation for that image file according to this recorded information. In this case, it is possible to make it unnecessary to perform actuation for selecting and setting the operational mode from among the still image mode #1 through the still image mode #3.

Since, according to this Variant Embodiment #2, the still image printing modes are classified into the three different still image modes #1 through #3, and it is made possible to select any one of these, accordingly it is possible to select the output mode for outputting the selected image(s) as a projected image(s) or as a printed image(s).

Since, in the still image mode #3, the selected images are projected by the projection unit 220 one at a time, it is possible to cause to be outputted, as projected images, only the images that the operator desires.

Variant Embodiment #3

In the case of the moving image mode as well, it would also be acceptable to arrange to perform the following operation, other than the operation described above. When, in the mode selection processing of the step S51, the CPU 101 sets the moving image mode, any one of a moving image mode #1 through a moving image mode #3 is further selected and set according to an actuation signal from an actuation member 103.

Figure 13:
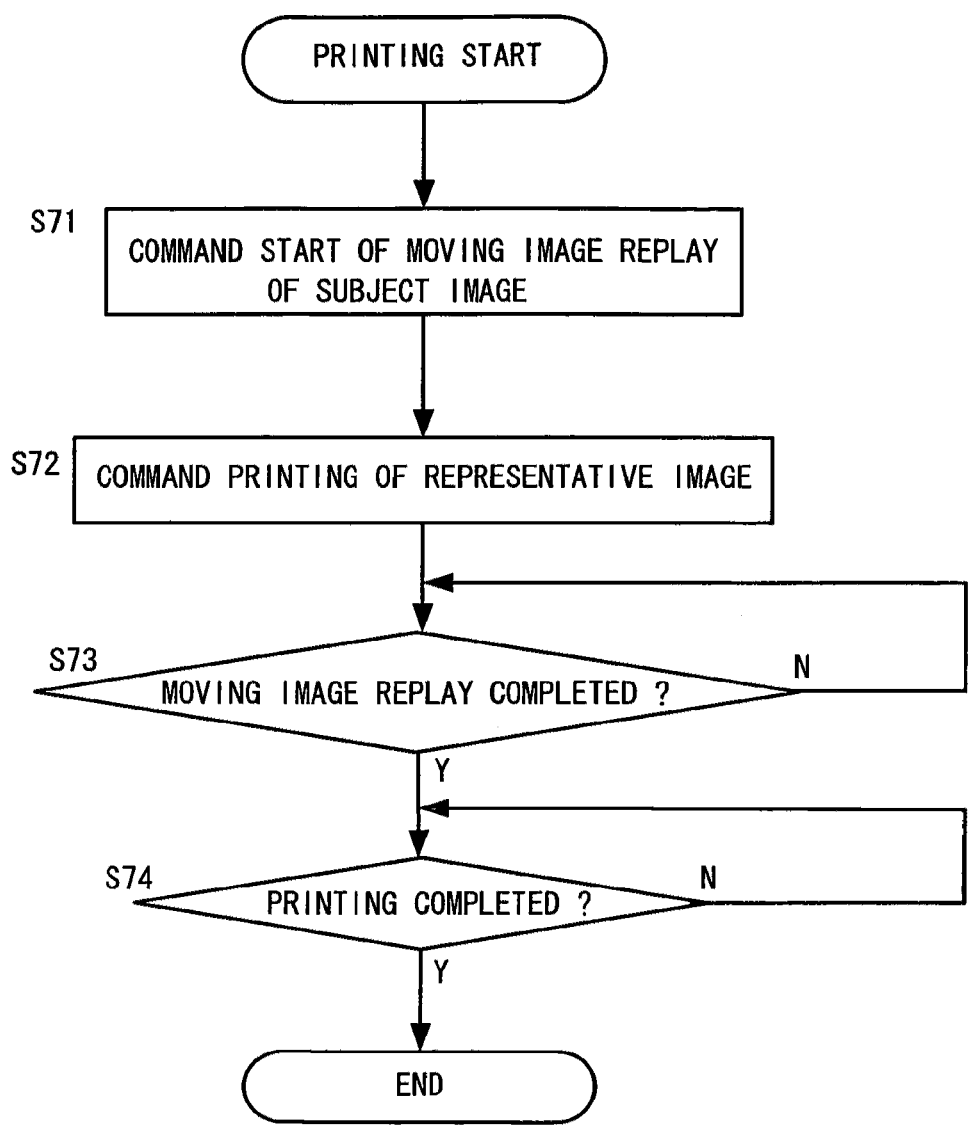
FIG. 13 is a flow chart for explanation of the details of printing processing during the moving image mode.

The moving image mode #1 is a mode in which operation is performed in the mode shown in FIGS. 5 and 13 and described above. And the moving image mode #2 is an operational mode in which only the operation of replay (projection) of the selected moving image file(s) is performed by the projection unit 220, but printing by the printer unit 120 is not performed. In concrete terms, in FIG. 13, the steps S72 and S7.4 are skipped, and only the steps S71 and S73 are executed.

And the moving image mode #3 is an operational mode in which, while performing the operation of replay (projection) of a selected moving image file with the projection unit 220, according to a printing command (an actuation signal from an actuation member 103) during this moving image replay, the printer unit 120 is caused to print images of each of a predetermined number of frames before and after a time point of generation of the actuation signal.

Figure 14:
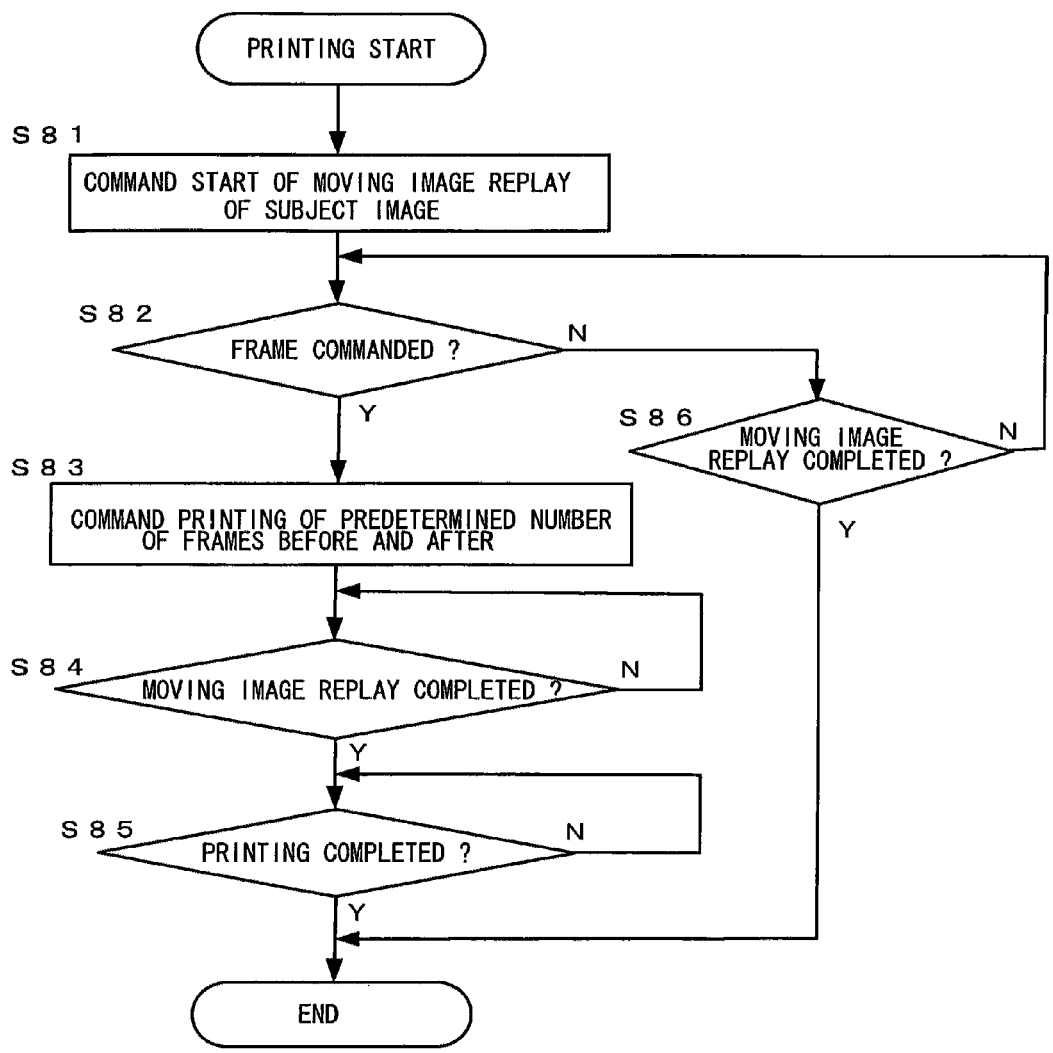
FIG. 14 is a flow chart for explanation of the details of printing processing during the moving image mode.

The details of this printing processing during the moving image mode #3 will now be explained while referring to the flow chart shown by way of example in FIG. 14. In a step S81 of FIG. 14, the CPU 101 commands the projection control circuit 224 to start the moving image replay of the selected moving image file that is the subject for printing (projection), and then the flow of control proceeds to a step S82. Due to this, the projection unit 220 starts moving image replay in order from the first frame.

In the step S82, the CPU 101 decides whether or not printing of a frame during this moving image replay has been designated. If an actuation signal is inputted from an actuation member 103 then the CPU 101 reaches an affirmative decision in this step S82 and the flow of control proceeds to a step S83, whereas if no such actuation signal is inputted then a negative decision is reached in this step S82 and the flow of control is transferred to a step S86.

In the step S83, the CPU 101 commands the printing control circuit 123 to perform printing of a predetermined number of frames (for example, eight frames), and then the flow of control proceeds to a step S84. In concrete terms, the CPU 101 sends to the printing control circuit 123, in order, the image data for the most recent (i.e. already projected) four frames extracted in a predetermined region in the memory 102, and the image data for the four frames to be extracted in the memory 102 directly after (i.e. before projection). By doing this, the printer unit 120 prints images of the four frames before and after the time point at which the frame printing command (i.e. the printing start command) was issued.

In the step S84, the CPU 101 makes a decision as to whether or not the moving image replay has ended. If a signal that indicates the end of projection of the final frame is inputted from the projection control circuit 224, then the CPU 101 reaches an affirmative decision in this step S84 and the flow of control proceeds to a step S85, whereas if no such signal that indicates the end of projection of the final frame is inputted, then a negative decision is reached in this step S84, and the above described decision processing is repeated.

In the step S85, the CPU 101 makes a decision as to whether or not printing has been completed. If a signal is inputted from the printing control circuit 123 that indicates that the images for a total of eight frames have been printed and that ejection of the printing paper 14 has been completed, then the CPU 101 reaches an affirmative decision in this step S85 and commands the projection control circuit 224 to terminate projection (i.e. to turn OFF the LED 223), and then the processing of FIG. 14 terminates. On the other hand, if no such printing end and paper ejection termination signal is inputted, then the CPU 101 reaches a negative decision in this step S85, and the above described decision processing is repeated.

In the step S86 that is reached via a negative decision in the step S82, the CPU 101 makes a decision as to whether or not moving image replay has been completed. If a signal is inputted from the projection control circuit 224 that indicates that projection of the last frame has been completed, then the CPU 101 reaches an affirmative decision in this step S86 and commands the projection control circuit 224 to terminate projection (i.e. to turn OFF the LED 223), and then the processing of FIG. 14 terminates. It is in the case where a frame printing command has not been issued that an affirmative decision in the step S86 is made. Thus, if no signal that indicates the termination of projection of the last frame is inputted, then the CPU 101 reaches a negative decision in the step S86, and the flow of control returns to the step S82 and the system waits for a frame printing command.

Since, according to this Variant Embodiment #3, the moving image printing modes are classified into the three different moving image modes #1 through #3, and it is made possible to select any one of these, it is possible to select the output mode for outputting as a projected image(s) or as a printed image(s).

In this moving image mode #3, it is arranged to cause the printer unit 120 to print a total of eight frames just before and directly after the time point at which a frame printing command was issued during replay projection of a moving image from the projection unit 220. Accordingly, it is possible to cause a plurality of printed images to be outputted, so as to include the cut that the operator desires.

It should be understood that it would also be acceptable to arrange to record information that specifies the operational mode to be applied within the Exif information for an image file, and to arrange to determine the mode of operation for that image file according to this recorded information. In this case, it is possible to make it unnecessary to perform actuation for selecting and setting the operational mode from among the moving image mode #1 through the moving image mode #3.

Variant Embodiment #4

In the still image mode #1, in accordance with the state of printing by the printer unit 120, it is arranged to widen the printing information (the selected image) that is included in the image projected by the projection unit 220 one line at a time (see FIG. 10). Conversely it would also be acceptable to arrange to narrow down the printing information (the selected image) that is included in the image projected by the projection unit 220 one line at a time, in accordance with the state of printing by the printer unit 120. In this case, at the initial start of printing, the projection unit 220 projects an initial optical image that includes the entire selected image. And, along with shifting the printing information (the selected image) included in the projected image in the downwards direction one line at a time in synchronization with the printing speed of the printer unit 120, the projection unit 220 also blacks out the projected image one line at a time from its top. Along with this shifting and the widening of the blacked out region BK, the printing information included in the projected image (i.e. the selected image) is gradually narrowed down. According to this Variant Embodiment #4, on the one hand, the printing information that is being projected (i.e. the selected image) appears to be drawn into the main body 11 of the printer along with the printing paper 14, and on the other hand the printing paper 14 that has been printed is gradually discharged into the output paper tray 13. As a result, the operator is able to be aware in real time of how far printing has progressed, while the selected image that is being projected reduces so as to change into the printed output.

Variant Embodiment #5

In addition to changing the printing information included in the image projected by the projection unit 220 (i.e. the selected image) in correspondence to the progression of printing by the printer unit 120, it would also be acceptable to arrange to add an effect by panning or tilting, or zooming up or zooming down the printing information included in the projected image (i.e. the selected image). If the time period that is required for printing is longer than a predetermined time period, then, by changing the projected image by adding an effect, while informing the operator that the time period required for printing is long, it is also ensured that the operator will not be bored by supplying a projected image that is changings.

Variant Embodiment #6

Although an example has been explained in which trapezoidal deformation of the image projected by the projection unit 220 is compensated electronically by the CPU 101, it would also be acceptable to arrange to compensate the projected image electronically for shaking that originates in vibration caused by the printer unit 120 during printing. Generally, the printer 10 vibrates when shifting the printer head 122 in the direction of the printing line, and when feeding the printing paper 14. The CPU 101 compensates the projected image so as to suppress shaking of the image that is projected upon the printing paper 14, caused due to this vibration. In concrete terms, the CPU 101 displaces the coordinate information that specifies the position of the image data extracted in a predetermined region in the memory 102, in synchronization with the shifting speed of the printer head 122, its shifting amount, its shifting direction, and the feed state of the printing paper 14. By doing this, the image data is electronically shifted in the memory space. The CPU 101 outputs to the projection control circuit 224 the projection data upon which shaking compensation processing during printing has been performed in this manner, and thereby suppresses any uncomfortable feeling that might be imparted to the operator by shaking of the projected image.

Variant Embodiment #7

It would also be acceptable to perform the detection of selection actuation for selecting an image that is to be the subject of printing from among a plurality of thumbnail images projected in a lineup (see FIG. 7) or representative images (see FIG. 11) by using an actuation signal from an electronic camera 100, instead of that from an actuation member 103. The electronic camera 100 of FIG. 2 is endowed with a function of wirelessly transmitting to the printer 10 the actuation signal from a cruciform key or a menu switch. The CPU 101 of the printer 10 selects an image that is to be the subject of being printed according to an actuation signal that is received via the external interface (I/F) circuit 104. The operator carries the electronic camera 100 with him, and is able to select an image that is to be the subject of being printed from a position that is remote from the printer 100. It should be understood that this transmission of an actuation signal to the printer 10 from the electronic camera 100 may also be by cable transmission. Accordingly, since it is possible for the printer 10 to receive a command specifying an image that is to be the subject of being printed by an actuation signal from the electronic camera 100, the operator is able to designate an image to be the subject of being printed from a position that is remote from the printer 10 by actuating the actuation member of the electronic camera 100, while checking in order the images that are being projected at large scale.

Embodiment Two

Figure 15:
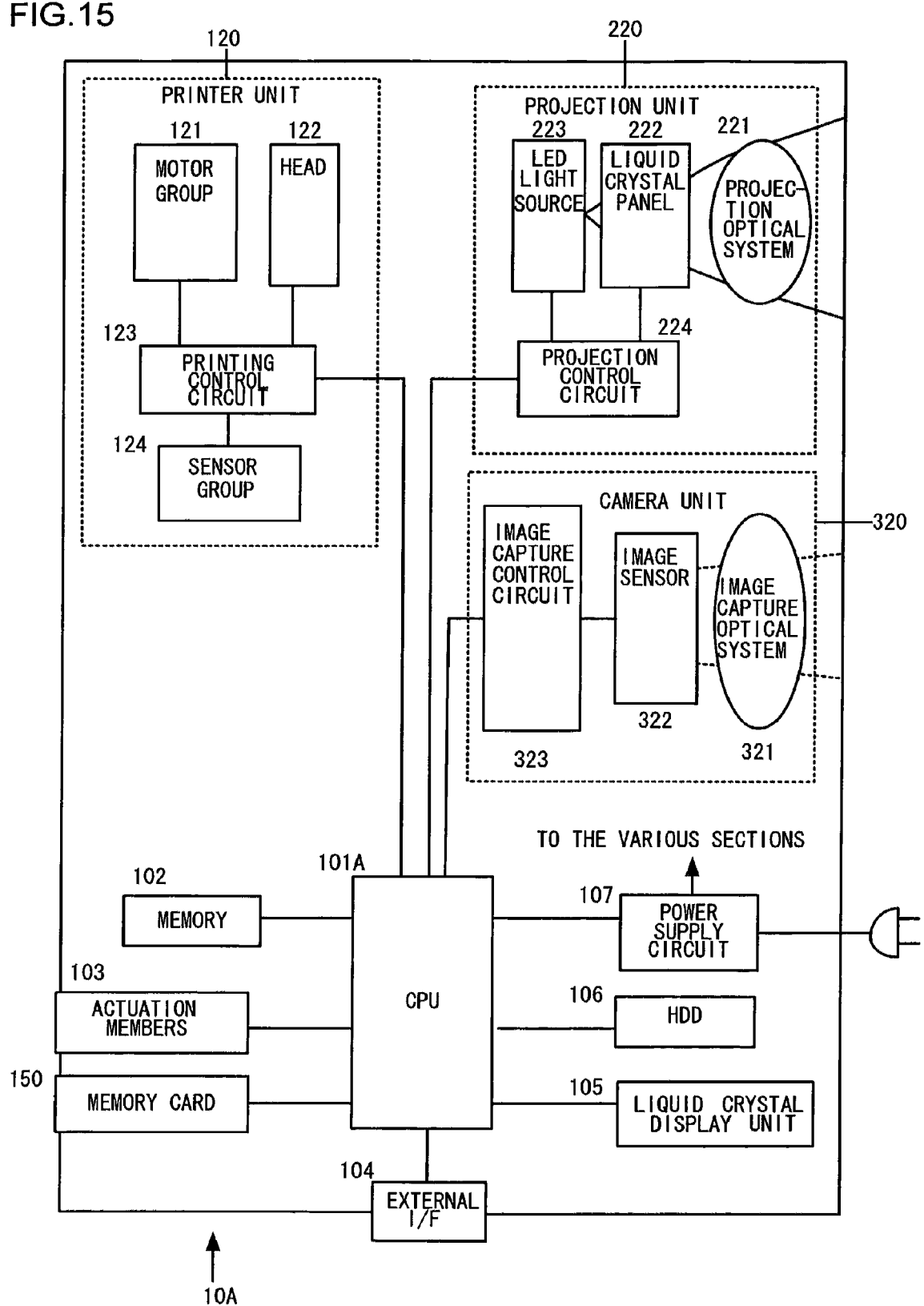
FIG. 15 is a block diagram for explanation of the structure of a printer that is equipped with a camera unit.

It would also be acceptable to provide a structure in which the printer is endowed with a function of capturing an image, and to perform detection of actuation for selecting an image that is to be the subject of being printed by using an image that the printer has captured. FIG. 15 is a block diagram for explanation of the structure of a printer 10A that is equipped with a camera unit 320. To structures that are the same as in the block diagram shown by way of example in FIG. 2 the same reference symbols are appended, and the explanation thereof is omitted. Here, in addition to performing control of the printer unit 120 and of the projection unit 220, the CPU 101A also performs control of a camera unit 320.

The camera unit 320 includes an image capture optical system 331, an image sensor 322, and an image capture control circuit 323, and captures the image projected by the projection unit 220 according to a command from the CPU 101A. The image capture optical system 321 and the image sensor 322 may be, for example, provided side by side in the neighborhood of the projection unit 220 as seen in FIGS. 1(a) and 1(b).

The image capture optical system 321 forms an image of the photographic subject (in this example, of the image projected upon the printing paper 14 that is loaded into the cover 12) upon an image capture surface of the image sensor 322. A CCD or CMOS image sensor or the like may be used as the image sensor 322. The image capture control circuit 323, along with drive controlling the image sensor 322 according to a command from the CPU 101A, also detects change of the captured image with an internal image change detection circuit (not shown in the figures). In concrete terms, for captured images outputted from the image sensor 322 at predetermined intervals (for example at 15 frames per second), the image capture control circuit 323 decides upon the presence or absence of difference in the image data between temporally consecutive frame images.

During projection of a thumbnail image (or of a representative image), the operator of this printer 10A may put his hand into the space between the printing paper 14 and the projection unit 220, and interrupts a portion of the projected light flux. Since, due to this, the hand of the operator is included in the frame image that is newly captured, accordingly a disparity is engendered between this frame image and the previous frame image i.e. the image changes).

The image capture control circuit 323 divides the captured image into a plurality of regions (that desirably should be made to correspond to the thumbnail image during projection), and, for each divided region (termed a "block") makes a decision as to whether or not the disparity between the newest frame image and the previous frame image is greater than a predetermined value. And, if the image capture control circuit 323 detects a block for which the disparity between frames exceeds the predetermined value, then it checks whether this state persists for greater than or equal to, for example, 0.5 seconds. And if, for the block that has been detected, the image capture control circuit 323 has decided that change of the captured image within the same block has occurred continuously thereafter for at least eight consecutive frames (in other words, if an image of the hand of the operator is captured for the same block continuously for 0.5 seconds or more), then the image capture control circuit 323 decides that this is an image that has been commanded to be printed, and accordingly sends a signal indicating this block to the CPU 101A.

Upon receipt of this signal designating the block, the CPU 101A correlates the projected image that was commanded to the projection control circuit 224 (in the example shown in FIG. 7, this is a plurality of images), and the signal that has been transmitted from the image capture control circuit 323, and detects the image that is to be the subject of being printed. For example, if the signal from the image capture control circuit 323 designates the lower left block on the projection screen, then the CPU 101A takes that thumbnail image (or the representative image) that the projection unit 220 is being caused to project at the lower left, as being the selected image.

On the other hand if, for the block that has been detected by the image capture control circuit 323, it has decided that change within the same block between seven consecutive subsequent frames has ceased to occur (in other words if, before 0.5 seconds elapses, an image of the hand of the operator is not captured in the same block), then the image capture control circuit 323 decides that this is not an image that has been commanded to be printed, and accordingly does not send any signal to the CPU 101A.

According to the second embodiment as explained above, the following beneficial operational effects are obtained.

(1) The camera unit 320 is included in the printer 10A that incorporates the projection unit 220, and the image that is projected by the projection unit 220 is captured at predetermined intervals by the camera unit 320. And the printer 10A detects change of the image occurring due to a hand being included in the frame image captured by the camera unit 320, and decides that image selection actuation has been performed. Due to this the operator is able, while looking at the projected image, to issue a command to this printer 10A by putting his hand in so that it intercepts the projected light flux (and is photographed by the camera unit 320).

(2) This printer 10A projects, from the projection unit 220, the optical images of the plurality of thumbnail images in a lineup, correlates the block in which change of the image has been detected as described in (1) above with the projected image, and takes that thumbnail image that is being projected in the position corresponding to the detected block as the image that is to be the subject of being printed. And the operator is able to use that image, among the plurality of thumbnail images being projected, which he desires to print, as a point of visual reference and as a criterion for the space into which to put his hand. Moreover, since it is arranged to detect change of the image in units of blocks, it is possible to reduce the amount of calculation, as compared to the case of performing detection for the entire area of the image.

(3) Since the image capture control circuit 323 decides that an image has been designated to be a subject of being printed if a hand or the like has been image captured continuously for 0.5 seconds or more in the detection block, even if mistakenly the operator puts his hand in front of the camera unit 320 an undesirable erroneous decision is not reached immediately.

Variant Embodiment #8

Figure 16:
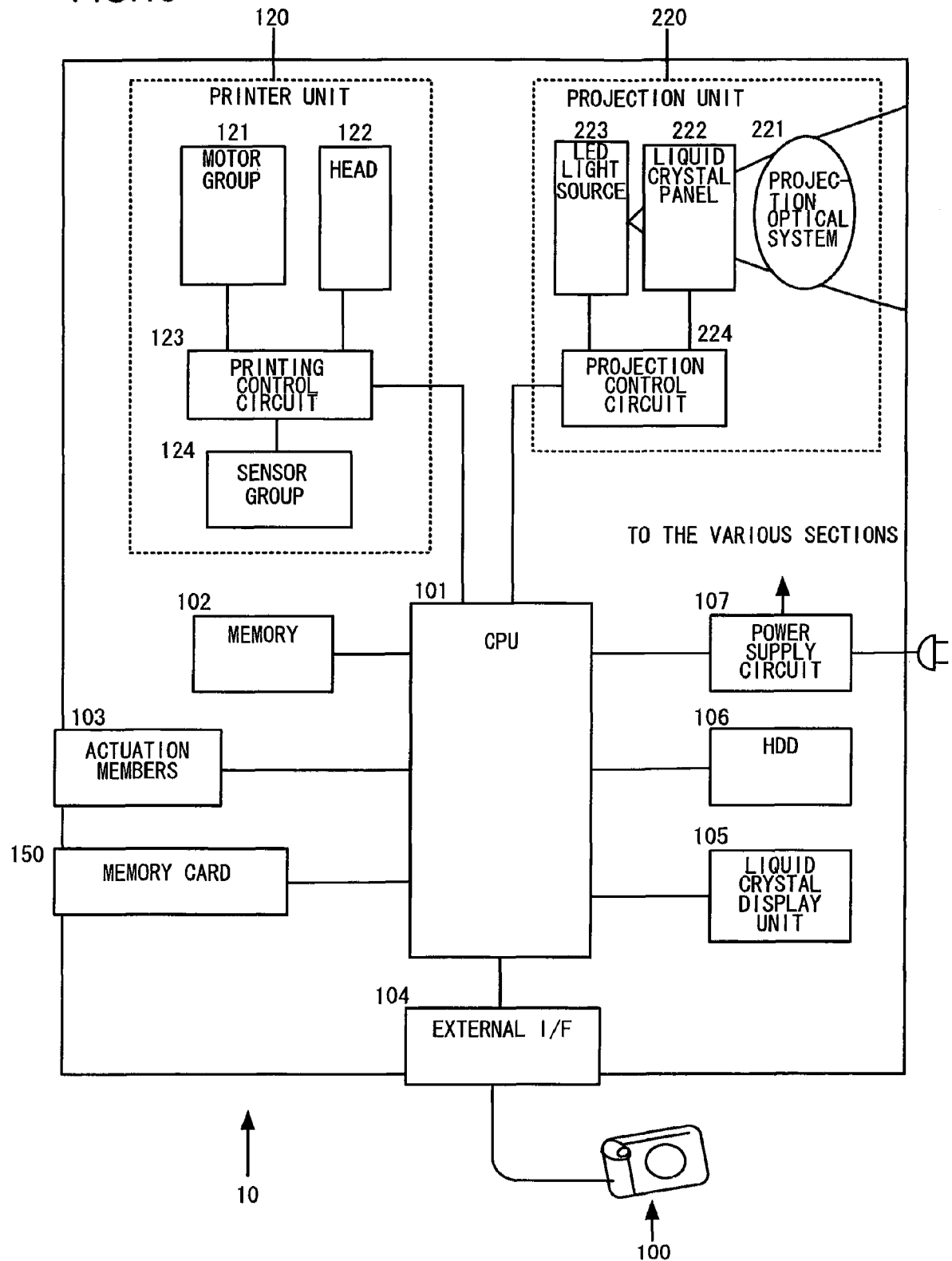
FIG. 16 is a figure for explanation of the structure of a printer system.

It would also be acceptable to arrange to perform selection actuation detection in a similar manner to the second embodiment, with a combination of a printer 10 that is not equipped with any camera unit 320, and an electronic camera 100. FIG. 16 is a block diagram for explanation of the structure of the printer system in this case. The printer 10 and the electronic camera 100 are cable connected together via an external interface circuit 104.

The electronic camera 100 is set up in a direction to capture the image projected by the projection unit 220. Moreover, the electronic camera 100 transmits to the printer 10 image data captured at pre-determined intervals (for example at 15 frames per second).

The CPU 101 of the printer 10 detects selection of an image to be a subject of being printed in a manner similar to that of the second embodiment, by deciding, for the image that is transmitted from the electronic camera 100, upon the presence or absence of difference in the image data between frame images continuing over time.

According to this Variant Embodiment #8, with a combination of the printer 10 that is not equipped with any camera unit 320, and the electronic camera 100, it is possible to provide a printer system in which an image to be a subject of being printed is selected by detecting the position at which the operator puts his hand.

Variant Embodiment #9

Figure 17:
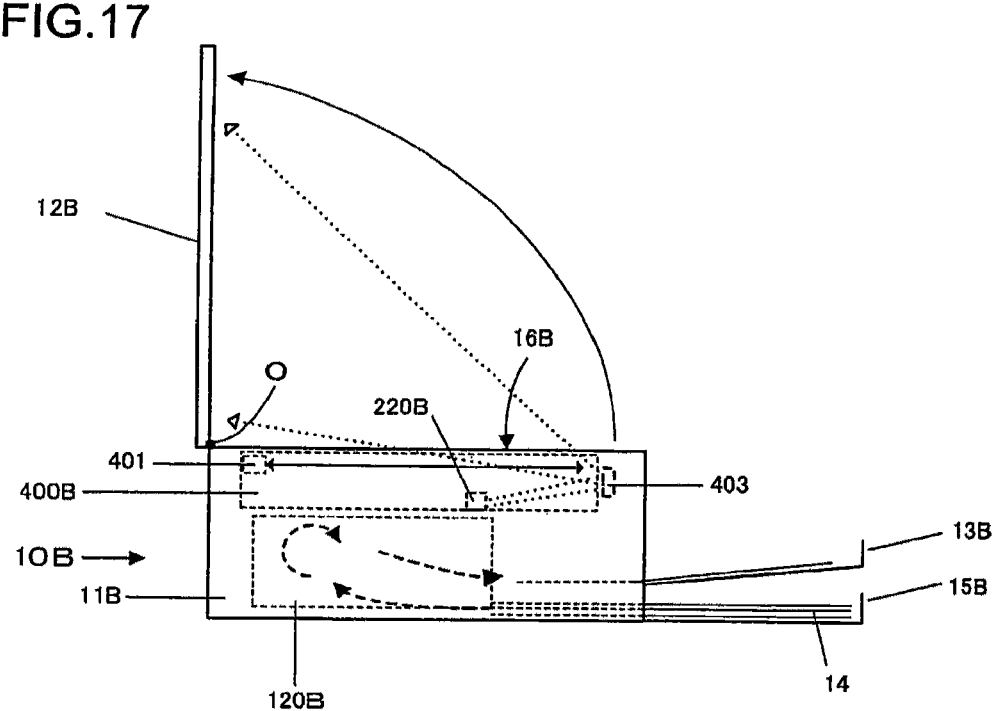
FIG. 17 is a figure for explanation of a printer according to a variant embodiment #9.

The present invention may also be applied to a printer that is endowed with a scanner function. FIG. 17 is a figure for explanation of a printer 10B according to this Variant Embodiment #9. This printer 10B includes a main body 11B, a cover 12B, an output paper tray 13B, and a paper supply tray 15B. A printer unit 120B and a scanner unit 400B are disposed within the main body 11B. The cover 12B also serves as a screen, and is made so as to rotate freely about a rotation shaft O as a center, between an opened position shown in FIG. 17 and a storage position in which the cover 12B is closed.

In FIG. 17, printing paper 14 that has been loaded into the paper supply tray 15B is supplied to the printer unit 120B one sheet at a time by a paper supply mechanism not shown in the figures. The printer unit 120B prints upon a sheet of the printing paper 14, and discharges this sheet of printing paper 14 into the output paper tray 13B after it has been printed.

The scanner unit 400B is provided with a line sensor unit 401. This line sensor unit 401 includes a lamp that illuminates a manuscript (not shown in the figure) mounted upon a manuscript mounting surface 16B made of glass, and a lens array (also not shown in the figure), and it performs reading a manuscript while shifting in the direction of the arrow sign. When a manuscript is thus being read, the cover 12B is closed to its storage position, so as to cover the manuscript (not shown in the figures).

A projector (a projection unit 220B) and a reflective mirror 403 are also provided to the scanner unit 400B. When the scanner unit 400B is not being used (i.e. when it is in its state in which the line sensor unit 401 is positioned to its wait position as shown in FIG. 17), it is arranged for this projection unit 220B to project an optical image towards the cover 12B that is in the opened state. The projected light flux proceeds towards the cover 12B, after having been folded around by the reflective mirror 403. The cover 12B is opened to its open position during such projection.

Since, according to this Variant Embodiment #9, the projection unit 220B projects an optical image upon the manuscript cover 12B, the surface upon which projection is performed and the surface upon which printing is performed are different, so that it is possible to continue projection by the projection unit 220B, not only before printing by the printer unit 120B (of course), but also during printing and after printing. Moreover, it is also not necessary to provide any dedicated projection screen, and the cover 12B can be rotated around the rotation shaft O as an axis, so that it is possible to store the cover 12B away in a compact manner.

Variant Embodiment #10

Figure 18:
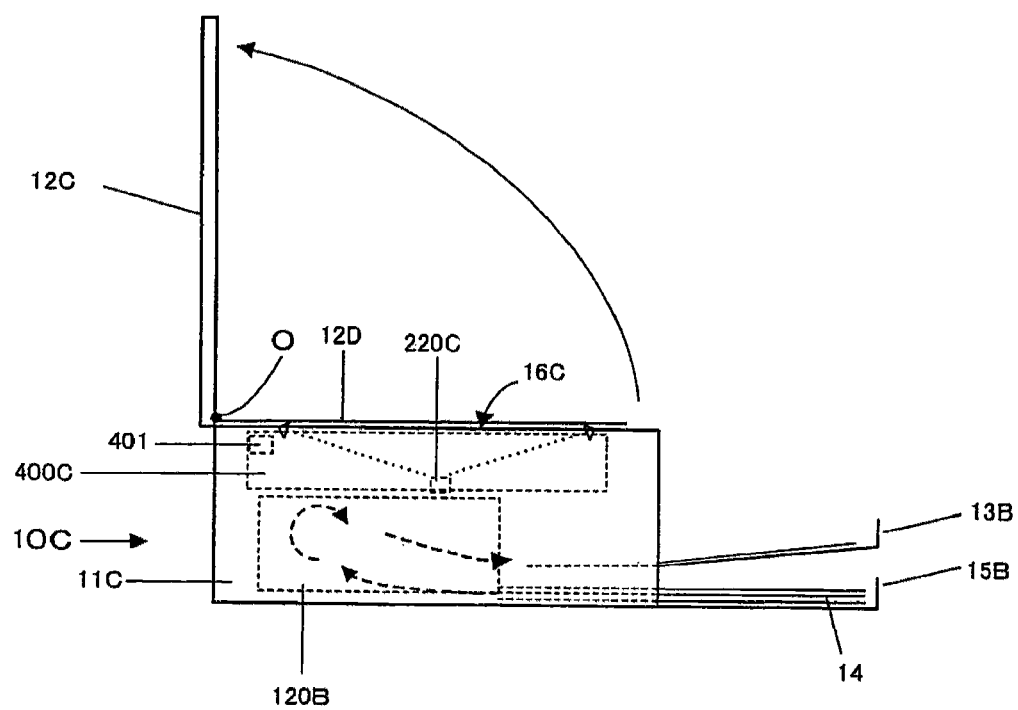
FIG. 18 is a figure for explanation of a printer according to a variant embodiment #10.

FIG. 18 is a figure for explanation of a printer 10C according to a Variant Embodiment #10. This printer 10c includes a main body 11C, a cover 12C, a cover 12D, an output paper tray 13B, and a paper supply tray 15B. A printer unit 120B and a scanner unit 400C are disposed within the main body 11C. The cover 12C is made so as to rotate freely about a rotation shaft O as a center, between an opened position shown in FIG. 18 and a storage position in which the cover 12C is closed. And the cover 12D is a translucent screen for rear surface projection, and is made so as to rotate freely about the rotation shaft O as a center, between the cover 12C and a manuscript mounting surface 16C.

In FIG. 18, printing paper 14 that has been loaded into the paper supply tray 15B is supplied to the printer unit 120B one sheet at a time by a paper supply mechanism not shown in the figures. The printer unit 120B prints upon a sheet of the printing paper 14, and discharges this sheet of printing paper 14 into the output paper tray 13B after it has been printed.

The scanner unit 400C is provided with a line sensor unit 401. This line sensor unit 401 is the same as in the case of FIG. 17. When a manuscript is being read, the covers 12C and 12D are closed so as to cover the manuscript (not shown in the figures).

A projector (a projection unit 220C) is also provided to the scanner unit 400C. When the scanner unit 400C is not being used (i.e. when it is in its state in which the line sensor unit 401 is positioned to its wait position as shown in FIG. 18), it is arranged for this projection unit 220C to perform rear surface projection of an optical image towards the cover 12D, that is in its closed state in which it is positioned over the manuscript mounting surface 16C. The cover 12C is opened to its open position during such projection.

Since, according to this Variant Embodiment #10, the projection unit 220C projects an optical image upon the cover 12D that is positioned over the manuscript mounting surface 16C from its rear surface, the surface upon which projection is performed and the surface upon which printing is performed are different. Thus it is possible to continue projection by the projection unit 220C, not only before printing by the printer unit 120B (of course), but also during printing and after printing. Moreover, it is easy to check the rear surface projected image, even if the environment is bright.

The above explained embodiments are only examples; the present invention is not to be considered as being limited to them. Moreover, the structures of the first embodiment, of the second embodiment, and of Variant Embodiments #1 through 10 may be combined as appears appropriate.

What is claimed is:

1. A printer, comprising:
a printing unit that prints printing information upon a print surface of an element to be printed upon;
a projection unit configured to project an optical image onto a print surface of an element to be printed upon; and
a control unit that controls the projection unit to project a first optical image as the optical image before printing by the printing unit is started and to project a second optical image as the optical image while the printing unit is printing the printing information, the first optical image representing all the printing information to be printed by the printing unit and the second optical image including a first projecting information corresponding to the printing information that has already been printed by the printing unit and a second projecting information corresponding to the printing information that is not yet printed by the printing unit, wherein the first projecting information is visibly different from the second projecting information.

2. A printer according to claim 1, further comprising:
an actuation member that generates a signal commanding printing;
and wherein
the control unit controls the printing unit to start the printing when the signal is received from the actuation member during projection of the first optical image by the projection unit.

3. A printer according to claim 1, wherein
the printing unit prints the printing information upon a printing range of the element to be printed upon; and
the control unit controls the projection unit so as to make a size of the optical image smaller than the printing range.

4. A printer according to claim 3, wherein
the optical image further includes range information representing a range of the element to be printed upon and the printing range; and
the control unit makes the range information and controls the projection unit to project the optical image.

5. A printer according to claim 1, further comprising:
a scanner unit that performs reading a manuscript; and
a manuscript cover that is disposed in a position different from that of the printing unit and covers the manuscript;
and wherein
the projection unit projects the optical image towards the manuscript cover.

6. A printer according to claim 1, further comprising:
a scanner unit that is disposed in a position different from that of the printing unit and performs reading a manuscript; and
a translucent screen that is mounted upon a surface upon which the manuscript is mounted when the scanner unit is not being used;
and wherein
the projection unit performs rear surface projection of the optical image towards the translucent screen.

7. A printer according to claim 1, wherein
the first part of the projecting information represents a state of progression of the printing by the printing unit.

8. A printer according to claim 7, wherein
the control unit commands the projection unit to project the second optical image, makes the first part of the projecting information by gradually widening a range along with the progression of printing by the printing unit, and controls the projection unit to project the second optical image so that the first part of the projecting information and the second part of the projecting information are visibly different when projected.

9. A printer according to claim 7, wherein
the control unit commands the projection unit to project the second optical image, makes the first projecting information by gradually narrowing a range corresponding to the second projecting information along with the progression of printing by the printing unit and controls the projection unit to project the second optical image so that the first projecting information and the second projecting information are visibly different when projected.

10. A printer according to claim 9, wherein
after the printing unit has started the printing, the control unit controls the projection unit to project the second optical image, makes the first projecting information by sequentially subtracting line information from the second projecting information and then controls the projection unit to project the second optical image, the line information corresponding to (a) lines that have been printed by the printing unit or (b) a line that is being printed by the printing unit.

11. A printer according to claim 8, wherein
after the printing unit has started printing, the control unit controls the projection unit to make the first projecting information by sequentially adding line information into the second projecting information and then controls the projection unit to project the second optical image, the line information corresponding to (a) lines that have already been printed by the printing unit or (b) a line that is being printed by the printing unit.

12. A printer according to claim 1, wherein
the information is constituted by image data, and the printer further comprises:
a selection unit that selects either a first printing mode in which an image based upon a moving image file is printed or projected, and a second printing mode in which an image based upon a still image file is printed or projected, wherein the control unit controls each of printing by the printing unit and projection by the projection unit according to the printing mode selected by the selection unit.

13. A printer according to claim 12, further comprising:
a printing subject designation unit that emits a signal designating a subject for being printed; and wherein
the selection unit selects the first printing mode if the subject for being printed that is designated is a moving image file, and selects the second printing mode if the subject for being printed that is designated is a still image file.

14. A printer according to claim 12, wherein:
the first printing mode includes: a first moving image mode in which a moving image is projected by the projection unit, and also an image of a predetermined frame among the frames that make up the moving image is printed by the printing unit; a second moving image mode in which a moving image is projected by the projection unit, and also the printing unit is not caused to perform printing;

and a third moving image mode in which a moving image is projected by the projection unit, and also images of a predetermined number of frames among the frames that make up the moving image are printed by the printing unit;

and the control unit selects any one of the first moving image mode through the third moving image mode, and controls each of printing by the printing unit and projection by the projection unit according to the moving image mode that has been selected.

15. A printer according to claim 1, further comprising:

an element storage unit disposed at the body that stores the element to be printed upon, wherein:

the projection unit projects the optical image onto the print surface of the element to be printed that is stored in the body of the printer.

16. A printer comprising:

a printing unit that prints information upon a print surface of an element to be printed upon;

a projection unit that projects an optical image onto a projection surface that is different from the print surface;

a control unit that causes the projection unit to project an optical image that represents the information to be printed by the printing unit before printing by the printing unit is started;

an image sensor that captures an optical image projected by the projection unit, and outputs an image signal;

an image change detection unit that detects a change of the image signal; and a printing subject designation unit that emits a signal designating an optical image that is projected in a position corresponding to a region in which the change of the image signal has been detected, as a subject for being printed; wherein:

when the control unit receives a signal that orders an optical image to be made a subject for being printed among a plurality of optical images that are being projected by the projection unit, the control unit controls the printing unit to print information corresponding to the optical image designated by the signal designating the subject for being printed among the plurality of optical images; and the control unit causes the printing unit to print the information upon receipt of the signal that designates the subject for being printed from the printing subject designation unit.

17. A printer according to claim 16, wherein:

the information is constituted by image data, and the projection unit projects a plurality of optical images arranged in a predetermined arrangement, each of which is replayed by using each of the plurality of the image data.

* * * * *